(12) United States Patent
Amano

(10) Patent No.: US 10,996,448 B2
(45) Date of Patent: May 4, 2021

(54) IMAGING OPTICAL SYSTEM, PROJECTION DISPLAY DEVICE, AND IMAGING APPARATUS HAVING A CATOPTRIC SYSTEM AND A DIOPTRIC SYSTEM

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/511,007

(22) Filed: Jul. 15, 2019

(65) Prior Publication Data
US 2020/0033570 A1   Jan. 30, 2020

(30) Foreign Application Priority Data

Jul. 26, 2018   (JP) .............................. JP2018-140605
Feb. 7, 2019   (JP) .............................. JP2019-021041

(51) Int. Cl.
*G02B 17/08* (2006.01)
*G03B 21/28* (2006.01)
*G03B 21/14* (2006.01)
*H04N 5/225* (2006.01)

(52) U.S. Cl.
CPC ........... *G02B 17/08* (2013.01); *G03B 21/142* (2013.01); *G03B 21/28* (2013.01); *H04N 5/2254* (2013.01)

(58) Field of Classification Search
CPC ...... G03B 21/28; G02B 17/08; G02B 17/082; G02B 17/0824; G02B 17/0828; G02B 17/0832; G02B 17/0836; G02B 17/084; G02B 17/0844; G02B 17/0848
See application file for complete search history.

(56) References Cited

U.S. PATENT DOCUMENTS

| | | | | |
|---|---|---|---|---|
| 6,984,044 B2* | 1/2006 | Kurioka | ................. | G02B 5/205 353/37 |
| 6,989,936 B2* | 1/2006 | Hatakeyama | .......... | G02B 13/16 359/649 |
| 7,048,388 B2* | 5/2006 | Takaura | ................. | G02B 13/16 353/102 |
| 7,957,078 B2* | 6/2011 | Minefuji | ............ | G02B 17/0816 353/99 |
| 8,071,965 B2* | 12/2011 | Nishikawa | ............. | G02B 17/08 250/504 R |
| 8,164,838 B2* | 4/2012 | Minefuji | ............ | G02B 17/0816 353/99 |

(Continued)

FOREIGN PATENT DOCUMENTS

JP    2008-250296 A    10/2008
JP    2017-040849 A    2/2017

*Primary Examiner* — Bao-Luan Q Le
(74) *Attorney, Agent, or Firm* — Studebaker & Brackett PC

(57) ABSTRACT

The imaging optical system consists of, in order from a magnification side: a catoptric system; and a dioptric system that includes a plurality of lenses. The dioptric system forms a first intermediate image between the dioptric system and the catoptric system on an optical path and at a position conjugate to a reduction side imaging surface, and the catoptric system re-forms the first intermediate image on a magnification side imaging surface. The catoptric system consists of, in order from the magnification side along the optical path, a first reflective surface having a positive power, a second reflective surface having a curved surface shape, and a third reflective surface having a positive power.

19 Claims, 24 Drawing Sheets

(56) References Cited

U.S. PATENT DOCUMENTS

| | | | |
|---|---|---|---|
| 8,992,025 B2* | 3/2015 | Piehler | G02B 5/08 353/78 |
| 9,581,888 B2* | 2/2017 | Piehler | G02B 5/08 |
| 10,466,452 B2* | 11/2019 | Minefuji | G02B 13/0095 |
| 2003/0133082 A1* | 7/2003 | Sunaga | G02B 17/0663 353/70 |
| 2004/0027662 A1* | 2/2004 | Kurioka | G02B 5/205 359/449 |
| 2004/0156117 A1* | 8/2004 | Takaura | G02B 17/0852 359/651 |
| 2004/0174611 A1* | 9/2004 | Hatakeyama | G02B 13/16 359/676 |
| 2004/0223126 A1* | 11/2004 | Hatakeyama | G02B 17/0848 353/122 |
| 2004/0264005 A1* | 12/2004 | Sunaga | G02B 17/0848 359/726 |
| 2005/0013021 A1* | 1/2005 | Takahashi | G02B 17/0832 359/837 |
| 2006/0088320 A1* | 4/2006 | Katashiba | G02B 17/0892 398/139 |
| 2006/0164605 A1* | 7/2006 | Kuwa | G02B 17/0848 353/78 |
| 2006/0198018 A1* | 9/2006 | Shafer | G02B 27/0025 359/365 |
| 2006/0227303 A1* | 10/2006 | Matsubara | G02B 17/0663 353/99 |
| 2007/0195289 A1* | 8/2007 | Ohzawa | G02B 13/16 353/99 |
| 2010/0020367 A1* | 1/2010 | Abe | H04N 1/0303 358/474 |
| 2010/0097582 A1* | 4/2010 | Nagase | G03B 21/28 353/98 |
| 2010/0103387 A1* | 4/2010 | Piehler | G02B 17/0832 353/78 |
| 2015/0160544 A1* | 6/2015 | Piehler | G03B 21/28 353/81 |
| 2015/0293434 A1* | 10/2015 | Matsuo | G02B 17/08 353/101 |
| 2017/0184843 A1* | 6/2017 | Kuzuhara | G02B 17/0848 |
| 2018/0246302 A1* | 8/2018 | Minefuji | G02B 13/18 |
| 2019/0107696 A1* | 4/2019 | Kano | G02B 17/0828 |
| 2019/0222728 A1* | 7/2019 | Aoki | G02B 5/08 |
| 2020/0142291 A1* | 5/2020 | Nishikawa | G02B 17/0832 |

* cited by examiner

EXAMPLE 1

EXAMPLE 1 MODIFICATION EXAMPLE 1

EXAMPLE 1

EXAMPLE 2

EXAMPLE 2 MODIFICATION EXAMPLE 1

EXAMPLE 2 MODIFICATION EXAMPLE 2

EXAMPLE 2 MODIFICATION EXAMPLE 3

EXAMPLE 2 MODIFICATION EXAMPLE 2

EXAMPLE 3

EXAMPLE 4

EXAMPLE 5

EXAMPLE 6

EXAMPLE 7

IMAGING OPTICAL SYSTEM, PROJECTION DISPLAY DEVICE, AND IMAGING APPARATUS HAVING A CATOPTRIC SYSTEM AND A DIOPTRIC SYSTEM

CROSS REFERENCE TO RELATED APPLICATIONS

The present application claims priority under 35 U.S.C. § 119 to Japanese Patent Application No. 2018-140605 filed on Jul. 26, 2018, and Japanese Patent Application No. 2019-021041 filed on Feb. 7, 2019. The above applications are hereby expressly incorporated by reference, in its entirety, into the present application.

BACKGROUND OF THE INVENTION

1. Field of the Invention

The present disclosure relates to an imaging optical system, a projection display device, and an imaging apparatus.

2. Description of the Related Art

In recent years, projection display devices, each of which is equipped with a light valve such as a liquid crystal display element or a digital micromirror device (DMD: registered trademark) display element, are widely spread and their performance has been improved. In particular, as the resolution of the light valve has been improved, a high demand has also been made for the resolution performance of the projection optical system.

In addition, there has been an increase in the demand to mount a highly versatile projection optical system on a projection display device. The projection optical system has a higher performance and a wider angle while having a small size in consideration of an increase in degree of freedom in setting the distance to the screen and installability in the indoor space.

In order to meet such demands, an imaging optical system, in which a dioptric system forms an intermediate image at a position conjugate to the reduction side imaging surface and a catoptric system re-forms the intermediate image on the magnification side imaging surface, has been proposed (for example, JP2008-250296A and JP2017-040849A).

SUMMARY OF THE INVENTION

The imaging optical system of JP2008-250296A is an optical system using a dioptric system and one aspheric reflective surface as a catoptric system. However, in the imaging optical system, one aspheric reflective surface re-forms an intermediate image. Therefore, in order to achieve wide angle, it is necessary to make the reflective surface larger. Further, in the imaging optical system of JP2008-250296A, in order to reduce the size of the reflective surface, the load on the dioptric system increases and the number of lenses increases. That is, the imaging optical system of JP2008-250296A has a problem that reduction in size is difficult.

Further, the imaging optical system of JP2017-040849A is an optical system using a dioptric system and three aspheric reflective surfaces as a catoptric system, reducing the load on the dioptric system, and reducing the number of lenses.

However, there is a problem that reduction in size is difficult since the reflective surface on the magnification side is large.

The present disclosure has been made in view of the above-mentioned circumstances, and its object is to provide an imaging optical system having a small size, a wide angle, and a high optical performance in which various aberrations are satisfactorily corrected, a projection display device comprising the imaging optical system, and an imaging apparatus comprising the imaging optical system. In the imaging optical system, an intermediate image is formed at a position conjugate to the reduction side imaging surface by the dioptric system, and the intermediate image is re-formed on the magnification side imaging surface by the catoptric system.

The specific means for achieving the object includes the following aspects.

<1> An imaging optical system consists of, in order from a magnification side: a catoptric system; and a dioptric system that includes a plurality of lenses. The dioptric system forms a first intermediate image between the dioptric system and the catoptric system on an optical path and at a position conjugate to a reduction side imaging surface, and the catoptric system re-forms the first intermediate image on a magnification side imaging surface. In addition, the catoptric system consists of, in order from the magnification side along the optical path, a first reflective surface having a positive power, a second reflective surface having a curved surface shape, and a third reflective surface having a positive power.

<2> The imaging optical system according to <1>, where a second intermediate image is formed between the first reflective surface and the second reflective surface on the optical path and at a position conjugate to the first intermediate image.

<3> The imaging optical system according to <1> or <2>, where rays traveling from the first reflective surface to the magnification side intersect rays traveling from the reduction side imaging surface to the magnification side imaging surface twice in the catoptric system.

<4> The imaging optical system according to any one of <1> to <3>, where the second reflective surface has a negative power.

<5> The imaging optical system according to any one of <1> to <4>, where all optical surfaces of the catoptric system are composed of rotationally symmetric surfaces centered on an optical axis of the catoptric system, and all optical surfaces of the dioptric system are composed of rotationally symmetric surfaces centered on an optical axis of the dioptric system.

<6> The imaging optical system according to <5>, where the optical axis of the catoptric system and the optical axis of the dioptric system are a common optical axis.

<7> The imaging optical system according to any one of <1> to <6>, where assuming that a focal length of the first reflective surface is f1, and a focal length of the third reflective surface is f3, Conditional Expression (1) is satisfied, which is represented by $$|f1|<|f3| \qquad (1).$$

<8> The imaging optical system according to any one of <1> to <7>, where assuming that a focal length of the whole system is f, and a focal length of the dioptric system is fL, Conditional Expression (2) is satisfied, which is represented by $$-0.15<|f|/fL<0.3 \qquad (2).$$

<9> The imaging optical system according to any one of <1> to <8>, where assuming that a focal length of the catoptric system is fR, and a focal length of the whole system is f, Conditional Expression (3) is satisfied, which is represented by $$0.8<|fR/f|<1.8 \quad (3).$$

<10> The imaging optical system according to any one of <1> to <9>, where assuming that a back focal length of the whole system is Bf, and a focal length of the whole system is f, Conditional Expression (4) is satisfied, which is represented by $$2<Bf/|f| \quad (4).$$

<11> The imaging optical system according to any one of <1> to <10>, where during focusing, a reflective surface closest to the dioptric system among the first reflective surface, the second reflective surface, and the third reflective surface is moved, and a part of the dioptric system is moved.

<12> The imaging optical system according to <8>, where Conditional Expression (2-1) is satisfied, which is represented by $$-0.1<|f1/fL<0.2 \quad (2-1).$$

<13> The imaging optical system according to <9>, where Conditional Expression (3-1) is satisfied, which is represented by $$1<|fR/f|<1.5 \quad (3-1).$$

<14> The imaging optical system according to <10>, where Conditional Expression (4-1) is satisfied, which is represented by $$4<Bf/|f|<15 \quad (4-1).$$

<15> A projection display device comprising: a light valve that outputs an optical image based on image data; and the imaging optical system according to any one of <1> to <14>. The imaging optical system projects the optical image, which is output from the light valve, on a screen.

<16> An imaging apparatus comprising the imaging optical system according to any one of <1> to <14>.

It should be noted that the above-mentioned "catoptric system" means an optical system that may include not only a reflective surface but also optical elements, such as a stop, a filter, and a cover glass, other than lenses.

The above-mentioned "dioptric system" means an optical system that may include a lens which does not have a refractive power substantially, and optical elements, such as a stop, a filter, a cover glass, a mirror, and a prism, other than lenses.

In the present specification, the terms "consisting of ~" and "consists of ~" means that each of the catoptric system and the dioptric system may include not only the above-mentioned elements but also members including mechanism parts such as a lens flange, a lens barrel, an imaging element, a focusing mechanism, and a camera shake correction mechanism.

The "focal length" used in a conditional expression is a paraxial focal length. The "back focal length" used in a conditional expression is a value in a case where the reduction side is the back side. The values used in Conditional Expressions are values on the d line basis. The sign of the power (including the refractive power) and the surface shape of an aspheric surface are considered in terms of the paraxial region unless otherwise noted. The "d line", "C line" and "F line" described in the present specification are emission lines. The wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

According to the present disclosure, it is possible to provide an imaging optical system, a projection display device comprising the imaging optical system, and an imaging apparatus comprising the imaging optical system. The imaging optical system has a small size, a wide angle, and a high optical performance in which various aberrations are satisfactorily corrected.

DESCRIPTION OF THE PREFERRED EMBODIMENTS

Figure 1:
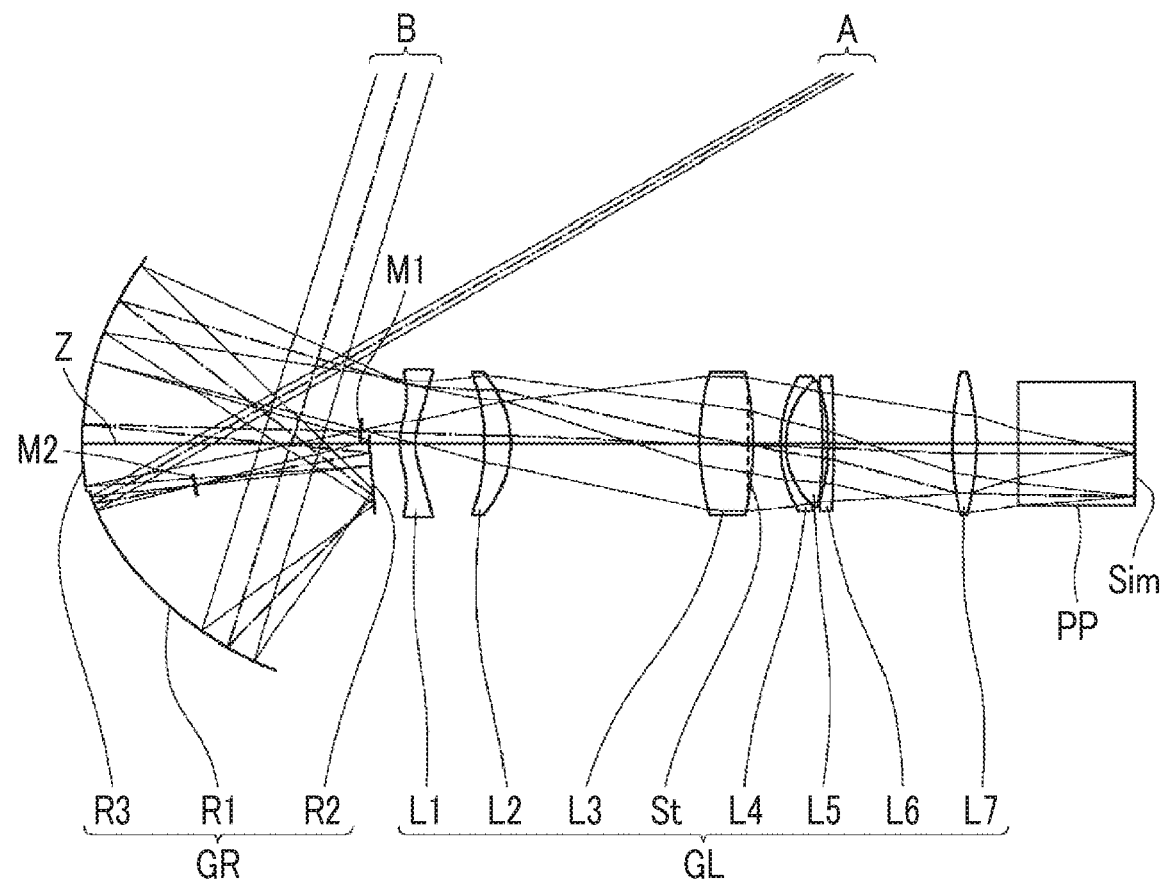
FIG. 1 is a cross-sectional view illustrating a configuration of an imaging optical system (common to Example 1) according to an embodiment of the present invention.
Figure 3:
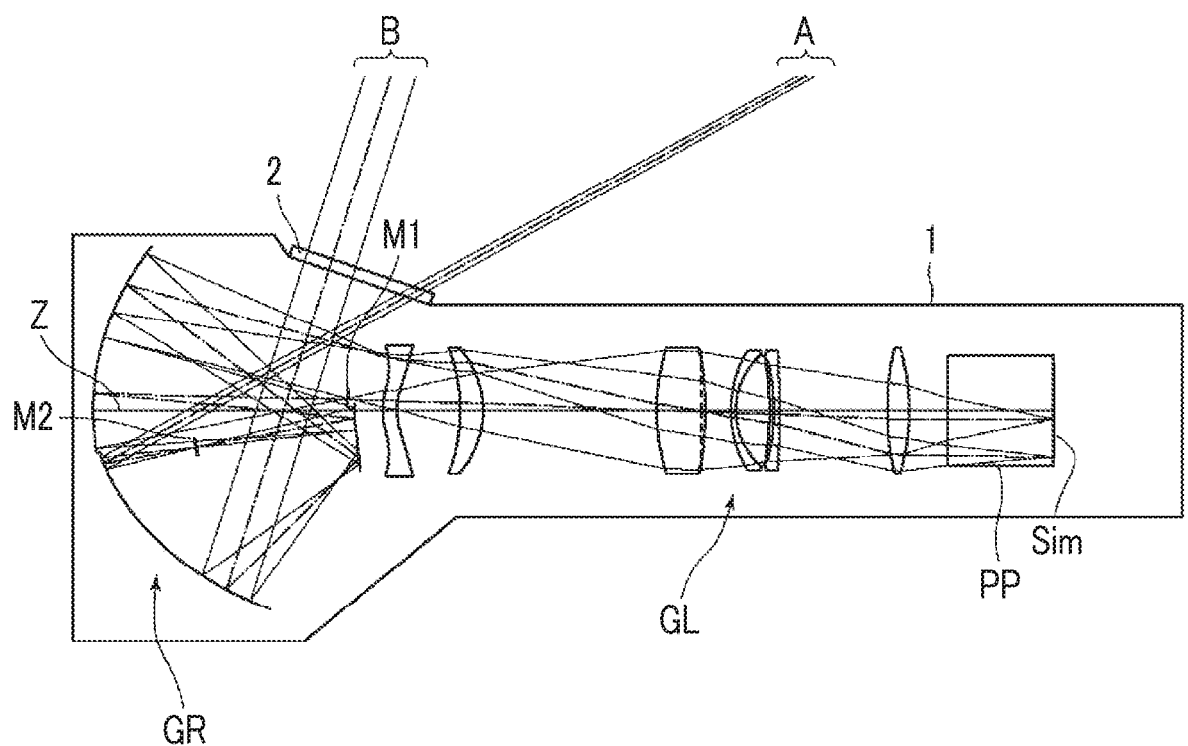
FIG. 3 is a cross-sectional view illustrating a state in which the imaging optical system of Example 1 of the present invention is housed in a housing.

Hereinafter, an embodiment of the present invention will be described in detail with reference to the drawing. FIG. 1 is a cross-sectional view illustrating a configuration of an imaging optical system according to an embodiment of the present invention, and FIG. 3 is a cross-sectional view illustrating a state in which the above-mentioned imaging optical system is housed in a housing. The configuration example shown in FIG. 1 is the same as the configuration of the imaging optical system of Example 1 described later. In FIG. 1, description is given under the assumption that the left side is the magnification side and the right side is the reduction side. Further, the aperture stop St shown in the drawing does not necessarily indicate its size and shape, and indicates its position on the optical axis Z. In addition, rays with the minimum angle of view A and rays with the maximum angle of view B are written together as the rays. The illustration method of FIG. 3 is the same as that of FIG. 1.

This imaging optical system is, for example, mounted on a projection display device, and can be used to project image information displayed on the light valve onto the screen (magnification side imaging surface). In FIG. 1, assuming that the imaging optical system is mounted on a projection display device, an optical member PP such as a filter or a prism used in a color synthesizing section or an illumination light separating section, and an image display surface (reduction side imaging surface) Sim of a light valve are also shown. In the projection display device, rays, which are made to have image information through the image display element disposed on the image display surface Sim, are incident into the imaging optical system through the optical member PP, and are projected onto a screen, which is not shown in the drawing, through the imaging optical system.

As shown in FIG. 1, the imaging optical system of the present embodiment consists of, in order from a magnification side: a catoptric system GR; and a dioptric system GL that includes a plurality of lenses. The dioptric system GL forms a first intermediate image M1 between the dioptric system GL and the catoptric system GR on an optical path and at a position conjugate to the reduction side imaging surface, and the catoptric system GR re-forms the first intermediate image M1 on the magnification side imaging surface.

As described above, in the imaging optical system that forms the intermediate image M1, the size of each reflective surface in the catoptric system GR can be reduced. In addition, by shortening the focal length of the whole system, it is possible to adopt a configuration suitable for wide angle.

The catoptric system GR consists of, in order from the magnification side along the optical path, a first reflective surface R1 having a positive power, a second reflective surface R2 having a curved surface shape, and a third reflective surface R3 having a positive power.

As described above, by reflecting light a plurality of times by the three reflective surfaces and lengthening a substantial optical path length, it is possible to minimize the power of each reflective surface to a low level while achieving reduction in size. As a result, the load on the dioptric system GL is reduced, and the number of lenses in the dioptric system GL can be reduced. Thus, the size of the entire imaging optical system can be reduced.

Further, by providing three reflective surfaces free from occurrence of chromatic aberration, it becomes possible to reduce occurrence of chromatic aberration in the entire optical system.

Furthermore, the first reflective surface R1 on the most magnification side is formed as a concave surface having a converging function. Thereby, the size of the first reflective surface R1 can be reduced. As shown in FIG. 3, in a case where the imaging optical system is housed in a housing 1, the size of the optical window 2 through which rays are emitted to the outside can be reduced, and stray light incident into the housing 1 from the outside can be reduced. Thus, the display quality can be improved.

In the imaging optical system of the present embodiment, it is preferable that a second intermediate image M2 is formed between the first reflective surface R1 and the second reflective surface R2 on the optical path and at a position conjugate to the first intermediate image M1. By adopting such a configuration, the focal length of the first reflective surface R1 can be shortened. Thus, the size of the first reflective surface R1 can be reduced. As a result, there is an advantage in widening the angle.

In a case where an intermediate image is formed between the second reflective surface R2 and the third reflective surface R3, in order to ensure the optical path length, it is necessary to make a distance between the third reflective surface R3 and the dioptric system GL long. Accordingly, the size of the third reflective surface R3 inevitably increases. Thus, this configuration is not preferable in terms of not only reduction in size of the third reflective surface R3 but also reduction in size of the entire imaging optical system. Therefore, in a case where the second intermediate image M2 is formed separately from the first intermediate image M1, it is preferable to form the second intermediate image M2 between the first reflective surface R1 and the second reflective surface R2.

Further, it is preferable that rays traveling from the first reflective surface R1 to the magnification side intersect rays traveling from the reduction side imaging surface to the magnification side imaging surface twice in the catoptric system GR. By adopting such a configuration, it is possible to correct aberrations (in particular, distortion and field curvature), which are caused by achieving the wide angle, while achieving reduction in size of the entire catoptric system GR.

Further, it is preferable that the second reflective surface R2 has a negative power. By adopting such a configuration, it is possible to achieve both wide angle and reduction in size while appropriately maintaining the power of the entire catoptric system GR.

Further, it is preferable that all optical surfaces of the catoptric system GR are composed of rotationally symmetric surfaces centered on an optical axis of the catoptric system GR. In addition, it is preferable that all optical surfaces of the dioptric system GL are composed of rotationally symmetric surfaces centered on an optical axis of the dioptric system GL. By adopting such a configuration, the structures of both the catoptric system GR and the dioptric system GL can be simplified, and there is an advantage in cost reduction. Furthermore, by making the optical axis of the catoptric system GR and the optical axis of the dioptric system GL as a common optical axis, design can be facilitated, and there is an advantage in cost reduction. In the example of the imaging optical system of the present embodiment shown in FIG. 1, the optical axis of the catoptric system GR and the optical axis of the dioptric system GL are a common optical axis Z.

Further, assuming that a focal length of the first reflective surface R1 is f1 and a focal length of the third reflective surface R3 is f3, it is preferable to satisfy Conditional Expression (1). Conditional expression (1) is an expression for maintaining the power balance in the catoptric system GR. By satisfying Conditional Expression (1), the power of the third reflective surface R3 becomes weaker than that of the first reflective surface R1. Thus, the first reflective surface R1 can be prevented from being enlarged. Accordingly, the second reflective surface R2 can also be prevented from increasing in size. As a result, there is an advantage in reduction in size of the entire catoptric system GR.

$$|f1|<|f3| \tag{1}$$

Further, assuming that a focal length of the whole system is f and a focal length of the dioptric system GL is fL, it is preferable to satisfy Conditional Expression (2). By not allowing the result of Conditional Expression (2) to be equal to or less than the lower limit, the negative power of the dioptric system GL is prevented from becoming excessively strong, and the height of rays incident on the catoptric system GR is prevented from becoming excessively low. Therefore, it is possible to prevent the interference between the first reflective surface R1 and the third reflective surface R3 and appropriately arrange the first reflective surface R1 and the third reflective surface R3. By not allowing the result of Conditional Expression (2) to be equal to or greater than the upper limit, it is possible to prevent the positive power of the dioptric system GL from becoming excessively strong. Thus, it becomes easy to correct various aberrations. As a result, there is an advantage in reduction in number of the lenses of the dioptric system GL. In addition, in a case where Conditional Expression (2-1) is satisfied, it is possible to obtain more favorable characteristics.

$$-0.15<|f|/fL<0.3 \tag{2}$$

$$-0.1<|f|/fL<0.2 \tag{2-1}$$

Further, assuming that a focal length of the catoptric system GR is fR and a focal length of the whole system is f, it is preferable to satisfy Conditional Expression (3). By not allowing the result of Conditional Expression (3) to be equal to or less than the lower limit, the catoptric system GR is compatible with a lens having a large F number. As a result, there is an advantage in correction of spherical aberration and astigmatism caused by achieving wide angle. By not allowing the result of Conditional Expression (3) to be equal to or greater than the upper limit, it is possible to prevent the size of the intermediate image M1 from becoming excessively large. Therefore, there are advantages in reduction in size of the catoptric system GR and correction of distortion and field curvature in the catoptric system GR.

In addition, in a case where Conditional Expression (3-1) is satisfied, it is possible to obtain more favorable characteristics.

$$0.8<|fR/f|<1.8 \tag{3}$$

$$1<|fR/f|<1.5 \tag{3-1}$$

Further, assuming that a back focal length of the whole system is Bf and a focal length of the whole system is f, it is preferable to satisfy Conditional Expression (4). By not allowing the result of Conditional Expression (4) to be equal to or less than the lower limit, it is possible to prevent the back focal length from becoming excessively short. Thus, it becomes easy to arrange the optical member PP such as a color synthesizing prism. In addition, in a case where Conditional Expression (4-1) is satisfied, it is possible to obtain more favorable characteristics. By not allowing the result of Conditional Expression (4-1) to be equal to or greater than the upper limit, there is an advantage in suppressing an increase in size of the entire lens system including the back focal length.

$$2<Bf/|f| \tag{4}$$

$$4<Bf/|f|<15 \tag{4-1}$$

Further, it is preferable that during focusing, a reflective surface closest to the dioptric system GL among the first reflective surface R1, the second reflective surface R2, and the third reflective surface R3 is moved, and a part of the dioptric system is moved. A wide-angle lens is characterized in the following points. Due to the depth of field which has a larger value at a position closer to the optical axis, the change in focal length is smaller than the change in projection distance, while the variation in field curvature is larger than the change in projection distance in the peripheral part of the projected image. Therefore, by moving the reflective surface closest to the dioptric system GL together with a part of the dioptric system GL, it is possible to suppress the variation in field curvature with respect to the change in projection distance. As a result, it is possible to maintain favorable performance. In addition, by moving the reflective surface closest to the dioptric system GL together with the part of the dioptric system GL, it is possible to collectively arrange mechanisms for moving these members. As a result, this configuration facilitates design and manufacture.

Next, numerical examples of the imaging optical system of the present invention will be described.

Example 1

Figure 2:
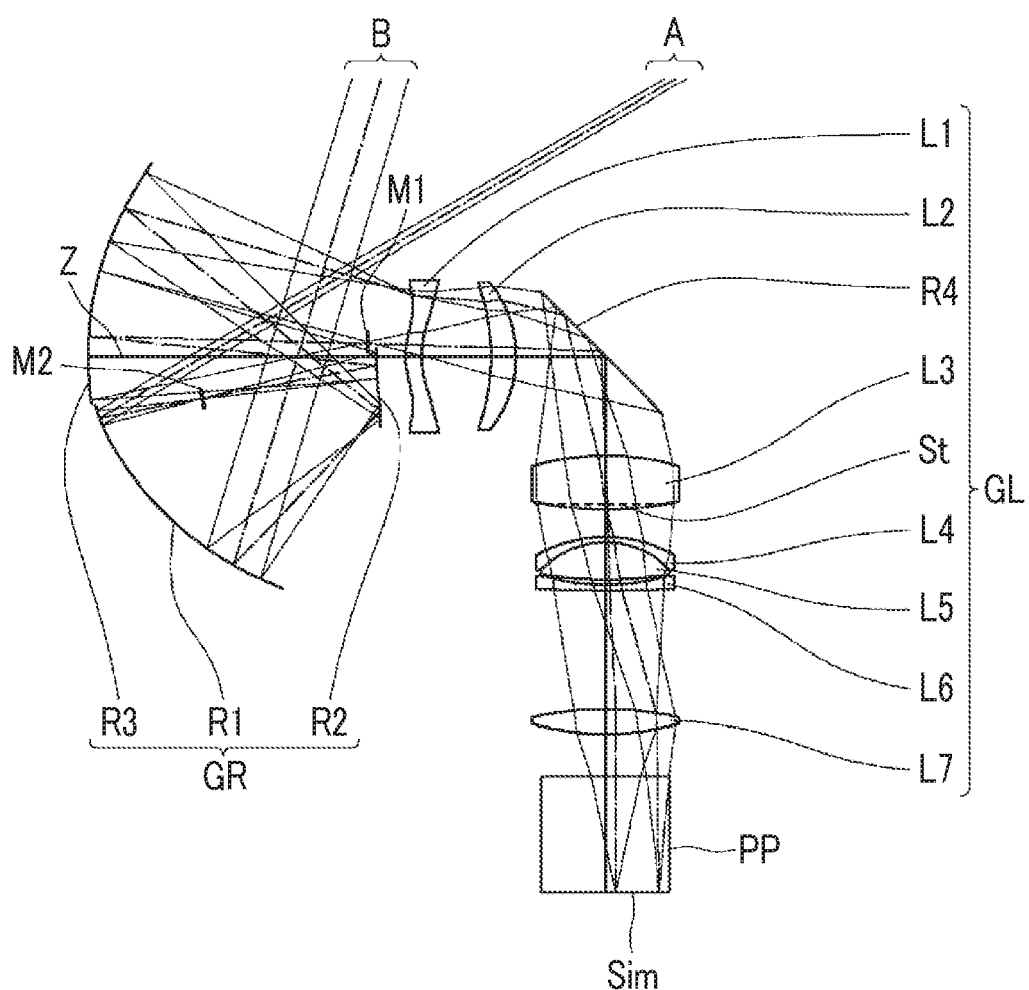
FIG. 2 is a cross-sectional view illustrating a modification example of the imaging optical system of Example 1 of the present invention.

FIG. 1 is a cross-sectional view illustrating a configuration of the imaging optical system of Example 1. FIG. 2 is a cross-sectional view illustrating a modification example of the imaging optical system of Example 1. FIG. 3 is a cross-sectional view illustrating a state in which the imaging optical system of Example 1 of the present invention is housed in a housing. The illustration method of FIG. 1 is as described above, and the illustration methods of FIGS. 2 and 3 are the same as that of FIG. 1. Therefore, the repeated description is partially omitted here. Further, the illustration method is basically the same in Examples 2 to 7.

The imaging optical system of Example 1 shown in FIG. 1 is composed of, in order from the magnification side along the optical path, a catoptric system GR consisting of three reflective surfaces R1 to R3 and a dioptric system GL consisting of seven lenses L1 to L7 and an aperture stop St.

During focusing, the second reflective surface R2, the lens L1, and the lens L2 move independently of each other.

In the modification example of the imaging optical system of Example 1 shown in FIG. 2, a reflective surface R4 (positioned at a distance of 22.4 on the magnification side from the surface vertex of surface number 9) is added in the dioptric system GL, and is configured to deflect the optical axis Z by 90° in the dioptric system GL.

FIG. 3 shows a state in which the imaging optical system of Example 1 shown in FIG. 1 is housed in the housing 1 provided with the optical window 2.

Table 1 shows basic lens data of the imaging optical system of Example 1, Table 2 shows data about specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 7.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows distances on the optical axis Z between the respective surfaces and the subsequent surfaces. Further, the column of n shows a refractive index of each optical element at the d line, and the column of ν shows an Abbe number of each optical element at the d line. Furthermore, the sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during focusing, DD[surface number] is noted. Numerical values each corresponding to the DD[surface number] are shown in Table 3.

In the data about the specification of Table 2, absolute values of the focal length |f| the back focal length Bf, the F number FNo, and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10$^{±n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and Σ at the aspheric surface depth Zd means the sum with respect to m.

In the basic lens data and data about specification, "°" is used as a unit of angle, and "mm" (millimeter) is used as a unit of length, but appropriate different units may be used since the optical system can be used even in a case where the system is enlarged or reduced in proportion.

TABLE 1

Example 1 Lens Data (n, ν at the d line)

| Surface Number | Radius of Curvature | Surface Distance | n | ν |
|---|---|---|---|---|
| *1 | 36.5197 | DD[1] | Reflective Surface | |
| *2 | 47.8654 | DD[2] | Reflective Surface | |
| *3 | 69.8622 | DD[3] | Reflective Surface | |
| 4 | ∞ | DD[4] | | |
| *5 | 18.6888 | 3.5005 | 1.51007 | 56.24 |
| *6 | 18.8175 | DD[6] | | |
| 7 | −48.2000 | 5.5934 | 1.51680 | 64.20 |
| 8 | −25.9605 | DD[7] | | |
| 9 | 58.9129 | 11.9994 | 1.62041 | 60.29 |
| 10 | −77.4272 | −1.1736 | | |
| 11(Stop) | ∞ | 7.3375 | | |
| 12 | 31.9631 | 1.2000 | 1.80610 | 40.93 |
| 13 | 20.1245 | 8.3460 | 1.48749 | 70.44 |
| 14 | −85.6714 | 1.1531 | | |
| 15 | −47.3857 | 1.2001 | 1.84666 | 23.78 |
| 16 | −402.9517 | 26.4893 | | |
| 17 | 76.4627 | 5.3920 | 1.72916 | 54.68 |
| 18 | −62.7779 | 9.5000 | | |
| 19 | ∞ | 25.9700 | 1.51680 | 64.20 |
| 20 | ∞ | 0.2137 | | |

TABLE 2

Example 1 Specification (d line)

| | |
|---|---|
| \|f\| | 3.83 |
| Bf | 26.84 |
| FNo. | 1.60 |
| 2ω[°] | 146.6 |

TABLE 3

Example 1 Variable Surface Distance

| Projection Distance | 501 | 410 | 666 |
|---|---|---|---|
| DD[1] | 64.2646 | 64.5019 | 64.0048 |
| DD[2] | −64.2646 | −64.5019 | −64.0048 |
| DD[3] | 64.2646 | 64.5019 | 64.0048 |
| DD[4] | 6.8527 | 6.4464 | 7.2959 |
| DD[6] | 15.5382 | 15.4369 | 15.6523 |
| DD[7] | 42.4008 | 42.671 | 42.1032 |

TABLE 4

Example 1 Aspheric Surface Coefficient

| Surface Number | 1 | 2 | 3 |
|---|---|---|---|
| KA | 3.970556451847E−01 | 6.375328041599E+00 | −1.067094394260E+00 |
| A3 | 0.000000000000E+00 | 0.000000000000E+00 | 0.000000000000E+00 |
| A4 | −1.438235814699E−06 | −2.427835525832E−05 | 6.638301783762E−07 |
| A5 | 2.775985638888E−09 | 4.389445509324E−07 | 7.081407173023E−09 |
| A6 | 6.193360196104E−10 | −4.804317278001E−07 | −6.298997896770E−10 |
| A7 | −1.537731855829E−11 | 3.948218082815E−08 | 2.397338590286E−11 |
| A8 | 1.759177264219E−14 | 7.045899975586E−10 | −4.823671795080E−13 |
| A9 | 3.681774095682E−15 | −1.789214603504E−10 | 5.139640069788E−15 |
| A10 | −4.232202914765E−17 | 5.000534095492E−12 | −2.132092785964E−17 |

| Surface Number | 5 | 6 |
|---|---|---|
| KA | −1.000000001555E+01 | −1.000000889772E+01 |
| A3 | 0.000000000000E+00 | 0.000000000000E+00 |
| A4 | 1.008965139806E−04 | 1.462234287241E−04 |
| A5 | −7.926684717978E−06 | 1.263936371552E−06 |
| A6 | −1.024426083717E−06 | −2.066340584674E−06 |
| A7 | 5.355297220109E−09 | −6.385712273695E−08 |
| A8 | 3.610925637574E−09 | 1.719400718527E−08 |
| A9 | 4.169729637228E−10 | 3.693347601798E−10 |
| A10 | −3.084050863124E−11 | −7.431210951390E−11 |
| A11 | 4.684653315432E−13 | −9.431303219232E−13 |
| A12 | −3.361601655167E−14 | 1.679056035567E−13 |
| A13 | 1.614503742671E−17 | 9.051220610314E−16 |
| A14 | 7.936285080370E−17 | −1.555603326535E−16 |

Figure 14:
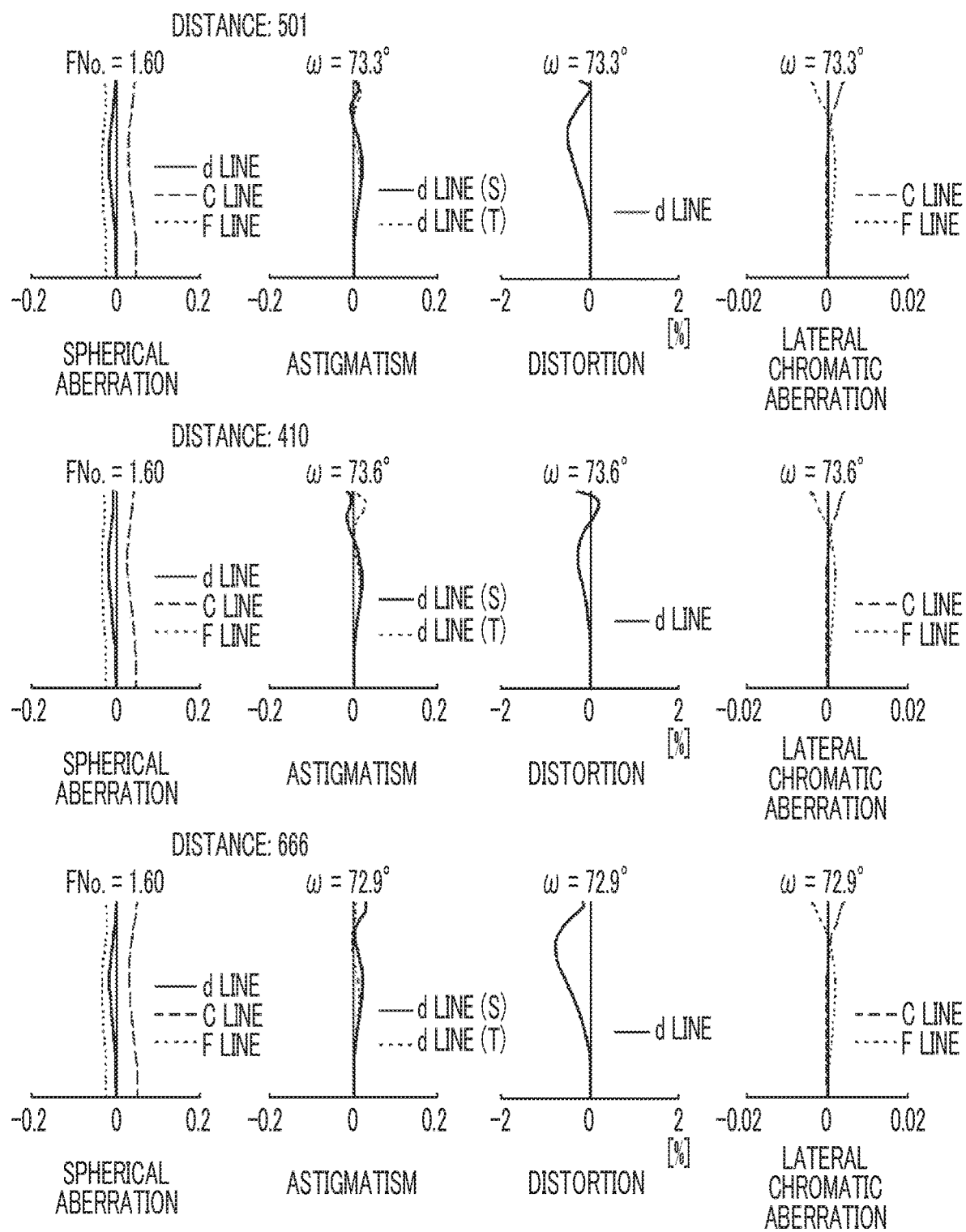
FIG. 14 is a diagram of aberrations of the imaging optical system of Example 1 of the present invention.

FIG. 14 shows a diagram of aberrations of the imaging optical system of Example 1. In FIG. 14, in order from the left side, spherical aberration, astigmatism, distortion, and lateral chromatic aberration are shown. In FIG. 14, the upper part shows a state in which the distance from the magnification side imaging surface to the first reflective surface R1 is 501, the middle part shows a state in which the distance from the magnification side imaging surface to the first reflective surface R1 is 410, and the lower part shows a state in which the distance from the magnification side imaging surface to the first reflective surface R1 is 666. In the spherical aberration diagram, aberrations at the d line, the C line, and the F line are indicated by the solid line, the long dashed line and the short dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view.

Example 2

Figure 4:
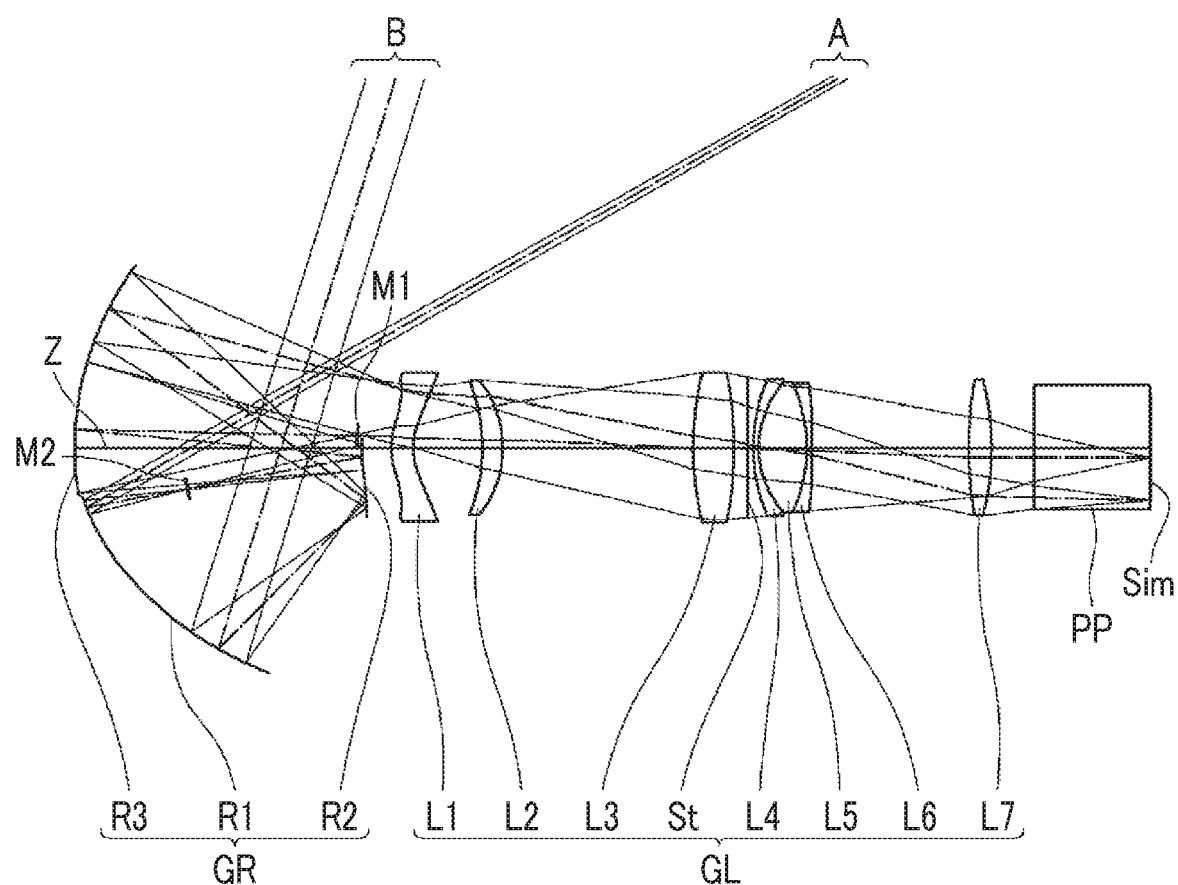
FIG. 4 is a cross-sectional view illustrating a configuration of an imaging optical system of Example 2 of the present invention.
Figure 5:
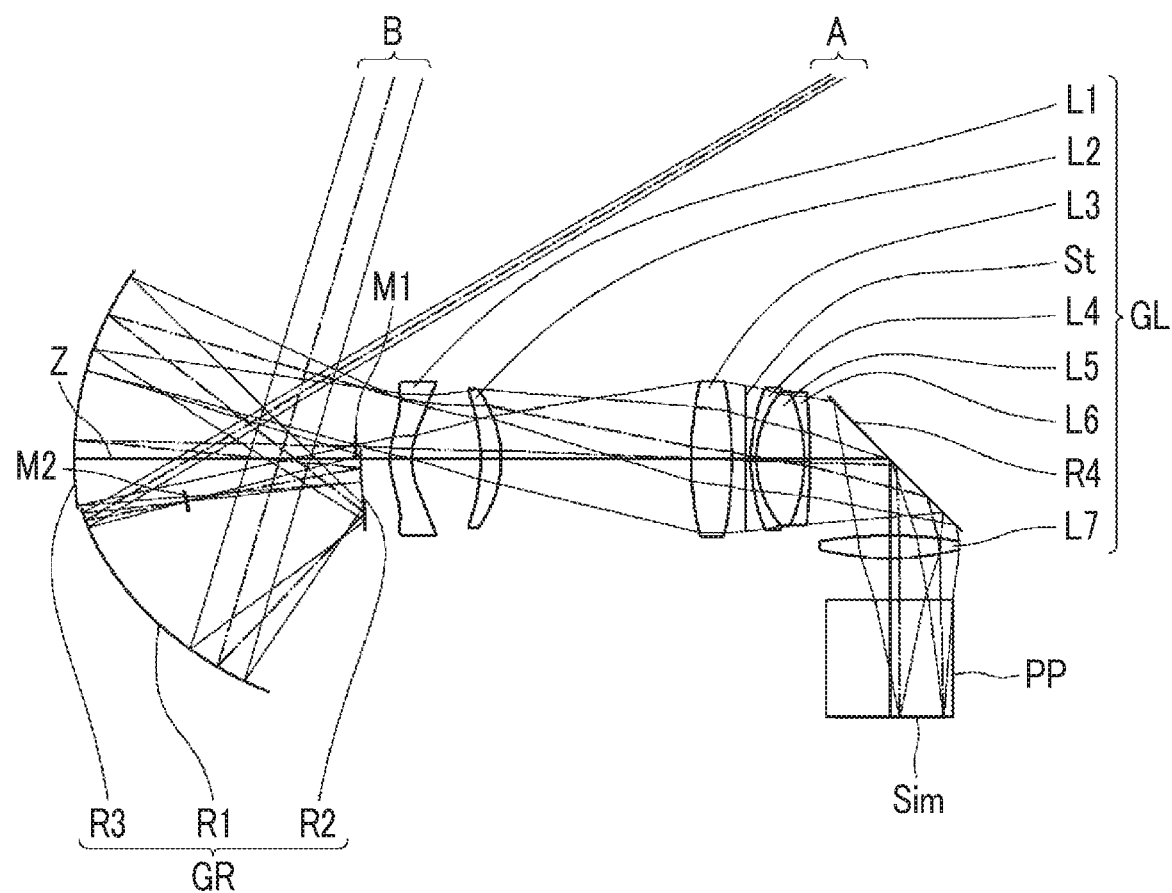
FIG. 5 is a cross-sectional view illustrating Modification Example 1 of the imaging optical system of Example 2 of the present invention.
Figure 6:
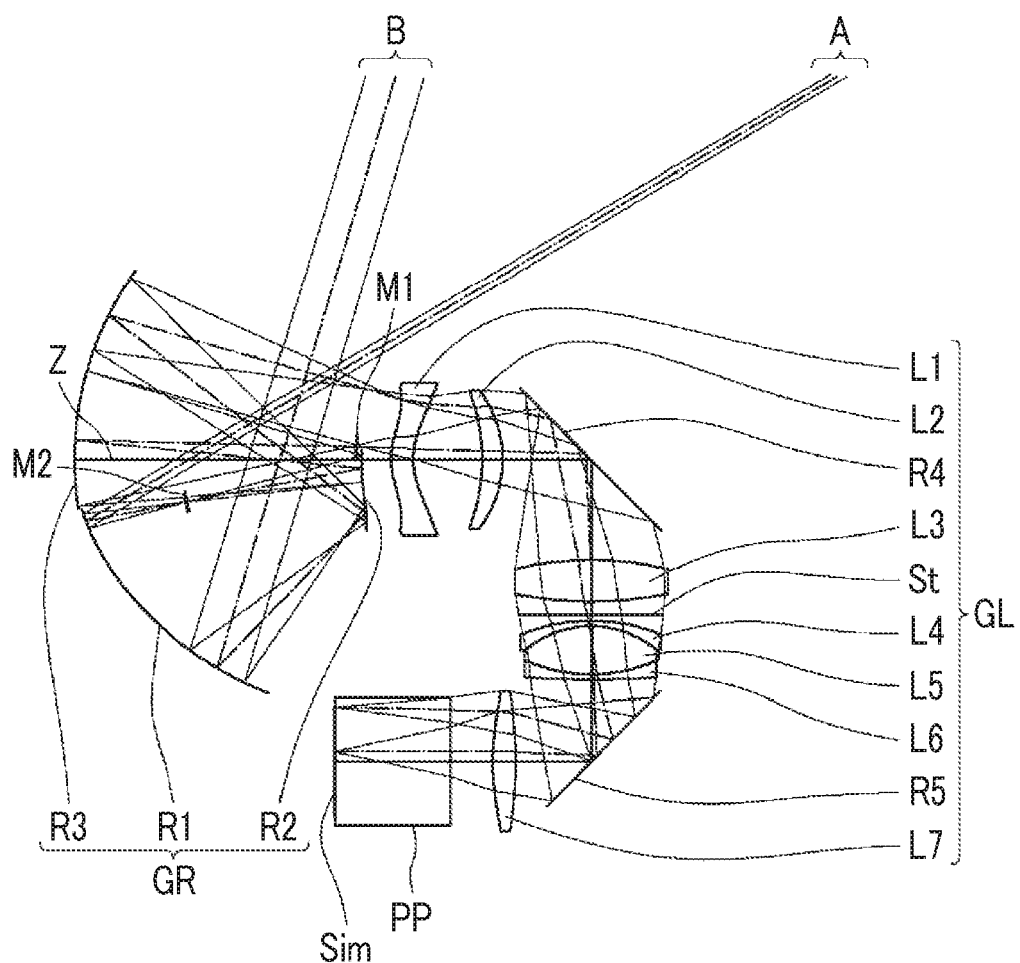
FIG. 6 is a cross-sectional view illustrating Modification Example 2 of the imaging optical system of Example 2 of the present invention.
Figure 7:
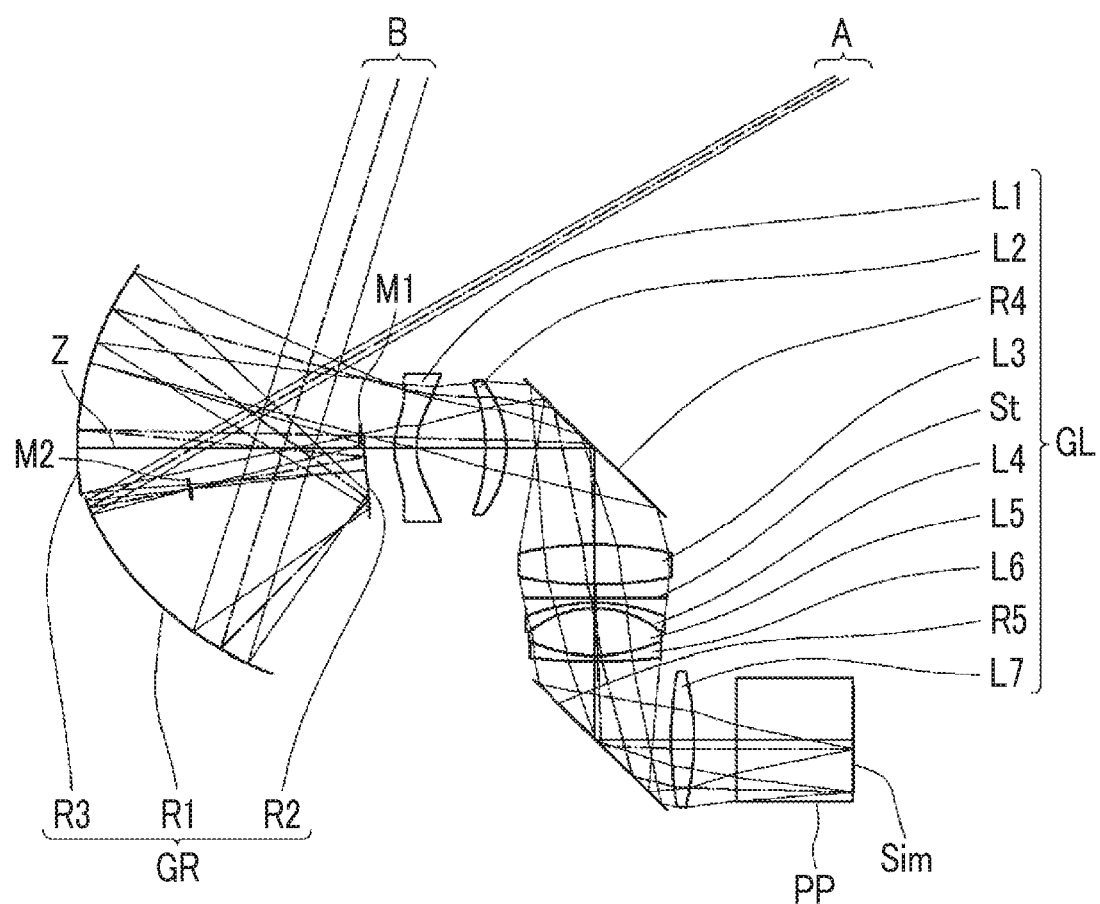
FIG. 7 is a cross-sectional view illustrating Modification Example 3 of the imaging optical system of Example 2 of the present invention.
Figure 8:
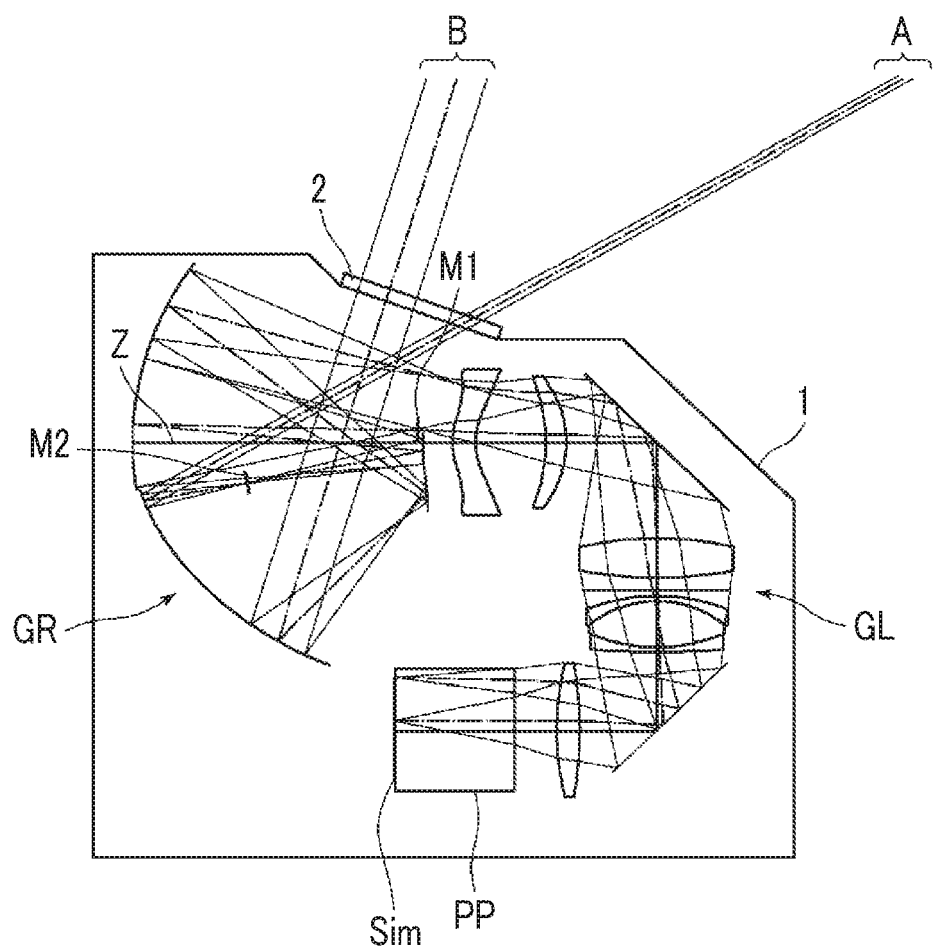
FIG. 8 is a cross-sectional view illustrating a state in which the imaging optical system of Modification Example 2 of Example 2 of the present invention is housed in the housing.

Next, an imaging optical system of Example 2 will be described. FIG. 4 is a cross-sectional view illustrating a configuration of an imaging optical system of Example 2. FIG. 5 is a cross-sectional view illustrating Modification Example 1 of the imaging optical system of Example 2. FIG. 6 is a cross-sectional view illustrating Modification Example 2 of the imaging optical system of Example 2. FIG. 7 is a cross-sectional view illustrating Modification Example 3 of the imaging optical system of Example 2. FIG. 8 is a cross-sectional view illustrating a state in which the imaging optical system of Modification Example 2 of Example 2 is housed in the housing.

The imaging optical system of Example 4 shown in FIG. 2 is composed of, in order from the magnification side along the optical path, a catoptric system GR consisting of three reflective surfaces R1 to R3 and a dioptric system GL consisting of seven lenses L1 to L7 and an aperture stop St. During focusing, the second reflective surface R2, the lens L1, and the lens L2 move independently of each other.

In Modification Example 1 of the imaging optical system of Example 2 shown in FIG. 5, a reflective surface R4 (positioned at a distance of 17 on the magnification side from the surface vertex of surface number 16) is added in the dioptric system GL, and is configured to deflect the optical axis Z by 90° in the dioptric system GL.

In Modification Example 2 of the imaging optical system of Example 2 shown in FIG. 6, a reflective surface R4 (positioned at a distance of 22.4 on the magnification side from the surface vertex of surface number 9) and a reflective surface R5 (positioned at a distance of 17 on the magnification side from the surface vertex of surface number 16) are added in the dioptric system GL, and are configured to deflect the optical axis Z by 90° twice in the same direction in the dioptric system GL.

In Modification Example 3 of the imaging optical system of Example 2 shown in FIG. 7, a reflective surface R4 (positioned at a distance of 22.4 on the magnification side from the surface vertex of surface number 9) and a reflective surface R5 (positioned at a distance of 17 on the magnification side from the surface vertex of surface number 16) are added in the dioptric system GL, and are configured to deflect the optical axis Z by 90° twice in the opposite directions in the dioptric system GL.

FIG. 8 shows a state in which the imaging optical system of Modification Example 2 of Example 2 shown in FIG. 6 is housed in the housing 1 provided with the optical window 2.

Figure 15:
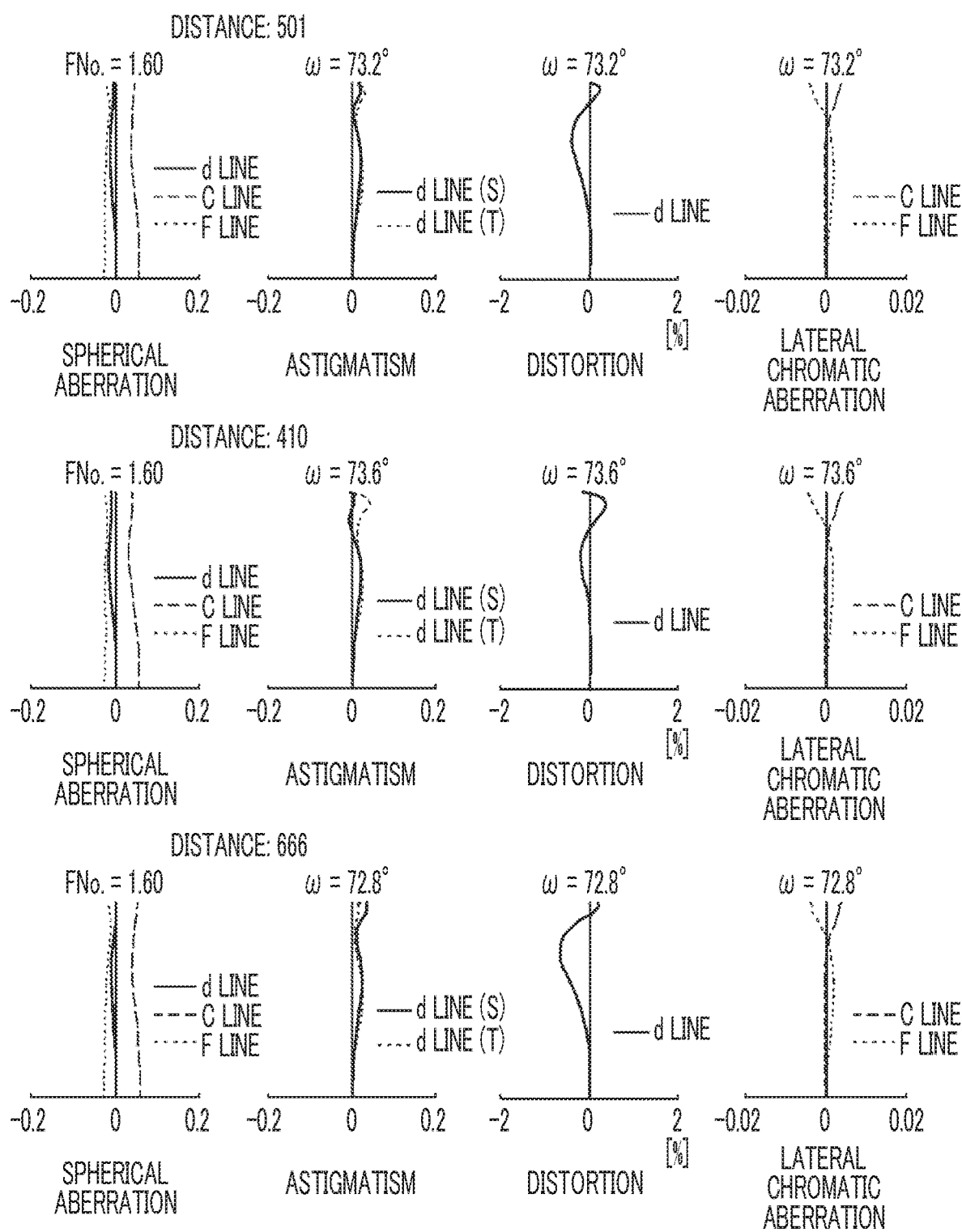
FIG. 15 is a diagram of aberrations of the imaging optical system of Example 2 of the present invention.

Table 5 shows basic lens data of the imaging optical system of Example 2, Table 6 shows data about specification, Table 7 shows data about variable surface distances, and Table 8 shows data about aspheric surface coefficients thereof. FIG. 15 shows aberration diagrams.

TABLE 5

Example 2 Lens Data (n, ν at the d line)

| Surface Number | Radius of Curvature | Surface Distance | n | ν |
|---|---|---|---|---|
| *1 | 36.401 | DD[1] | Reflective Surface | |
| *2 | 44.5182 | DD[2] | Reflective Surface | |
| *3 | 70.2424 | DD[3] | Reflective Surface | |
| 4 | ∞ | DD[4] | | |
| *5 | 17.3155 | 4.8851 | 1.51007 | 56.24 |
| *6 | 16.6231 | DD[6] | | |
| 7 | −41.5555 | 4.5646 | 1.51680 | 64.20 |
| 8 | −25.3149 | DD[7] | | |
| 9 | 72.8001 | 9.2116 | 1.76200 | 40.10 |
| 10 | −87.1989 | 3.0421 | | |
| 11(Stop) | ∞ | 1.2220 | | |
| 12 | 40.8226 | 1.2002 | 1.79360 | 37.09 |
| 13 | 22.8072 | 10.7724 | 1.48749 | 70.44 |
| 14 | −36.0043 | 1.2000 | 1.84666 | 23.78 |

TABLE 5-continued

Example 2 Lens Data (n, ν at the d line)

| Surface Number | Radius of Curvature | Surface Distance | n | ν |
|---|---|---|---|---|
| 15 | −174.4029 | 35.0003 | | |
| 16 | 86.5470 | 5.1186 | 1.72916 | 54.68 |
| 17 | −67.2920 | 9.5000 | | |
| 18 | ∞ | 25.9700 | 1.51680 | 64.20 |
| 19 | ∞ | 0.2132 | | |

TABLE 6

Example 2 Specification (d line)

| | |
|---|---|
| \|f\| | 3.83 |
| Bf | 26.84 |
| FNo. | 1.60 |
| 2ω[°] | 146.4 |

TABLE 7

Example 2 Variable Surface Distance

| Projection Distance | 501 | 410 | 666 |
|---|---|---|---|
| DD[1] | 64.2864 | 64.5482 | 64.0009 |
| DD[2] | −64.2864 | −64.5482 | −64.0009 |
| DD[3] | 64.2864 | 64.5482 | 64.0009 |
| DD[4] | 6.669 | 6.2212 | 7.1548 |
| DD[6] | 15.4938 | 15.3187 | 15.6889 |
| DD[7] | 42.3963 | 42.7575 | 42.0009 |

TABLE 8

Example 2 Aspheric Surface Coefficient

| Surface Number | 1 | 2 | 3 |
|---|---|---|---|
| KA | 3.951381177550E−01 | 5.247335280822E+00 | −1.056494403965E+00 |
| A3 | 0.000000000000E+00 | 0.000000000000E+00 | 0.000000000000E+00 |
| A4 | −1.456394100562E−06 | −2.798984534118E−05 | 6.441839938464E−07 |
| A5 | 4.421791226618E−09 | −6.279940778471E−07 | 7.897152720187E−09 |
| A6 | 6.049936025521E−10 | −3.583532678344E−07 | −6.203929762640E−10 |
| A7 | −1.629056915869E−11 | 4.143643553563E−08 | 2.276611281375E−11 |
| A8 | 3.327304240980E−14 | 1.206745638569E−10 | −4.552436527578E−13 |
| A9 | 3.845461696847E−15 | −1.684093572940E−10 | 4.949704549774E−15 |
| A10 | −4.561002915545E−17 | 5.393717026264E−12 | −2.162373111110E−17 |

| Surface Number | 5 | 6 |
|---|---|---|
| KA | −9.999999999118E+00 | −1.000000489471E+01 |
| A3 | 0.000000000000E+00 | 0.000000000000E+00 |
| A4 | 1.969256284469E−04 | 2.946755431543E−04 |
| A5 | −1.554109945920E−05 | −4.565613309608E−06 |
| A6 | −1.259894945851E−06 | −3.334348861563E−06 |
| A7 | 8.216158244843E−08 | 7.032293176700E−10 |
| A8 | 6.410875483523E−10 | 2.348646797975E−08 |
| A9 | 1.130062759192E−10 | 3.894211222394E−11 |
| A10 | −1.193200277205E−11 | −9.319710470535E−11 |
| A11 | 1.539547326599E−12 | −1.498911321112E−13 |
| A12 | −1.164915051611E−13 | 2.013437068871E−13 |
| A13 | −8.756544567965E−16 | 1.776125003041E−16 |
| A14 | 1.833366750732E−16 | −1.832916097717E−16 |

Example 3

Figure 9:
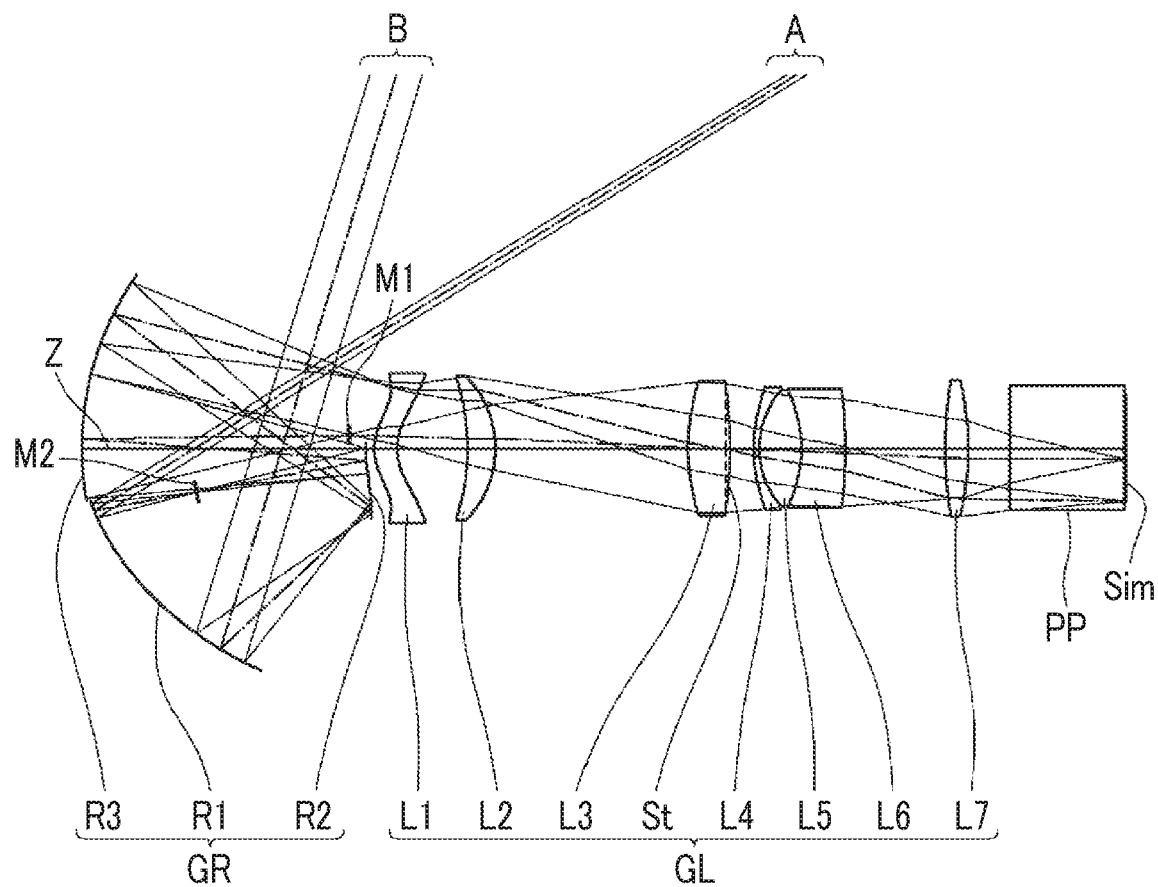
FIG. 9 is a cross-sectional view illustrating a configuration of an imaging optical system of Example 3 of the present invention.
Figure 16:
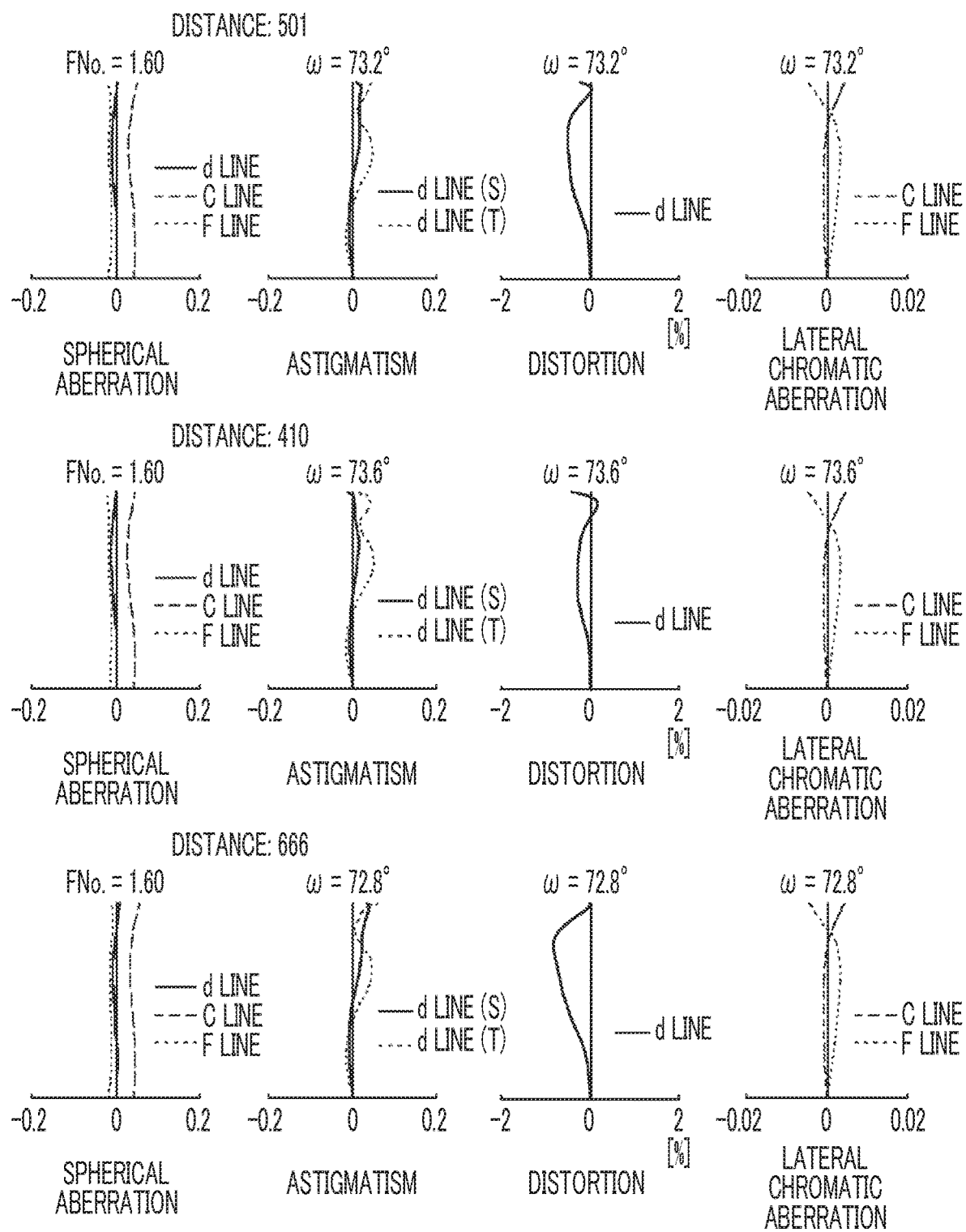
FIG. 16 is a diagram of aberrations of the imaging optical system of Example 3 of the present invention.

Next, an imaging optical system of Example 3 will be described. FIG. 9 is a cross-sectional view illustrating a configuration of the imaging optical system of Example 3. The imaging optical system of Example 3 is composed of, in order from the magnification side along the optical path, a catoptric system GR consisting of three reflective surfaces R1 to R3 and a dioptric system GL consisting of seven lenses L1 to L7 and an aperture stop St. During focusing, the second reflective surface R2, the lens L1, and the lens L2 move independently of each other. Table 9 shows basic lens data of the imaging optical system of Example 3, Table 10 shows data about specification, Table 11 shows data about variable surface distances, and Table 12 shows data about aspheric surface coefficients thereof. FIG. 16 shows aberration diagrams.

TABLE 9

Example 3 Lens Data (n, ν at the d line)

| Surface Number | Radius of Curvature | Surface Distance | n | ν |
|---|---|---|---|---|
| *1 | 35.7586 | DD[1] | Reflective Surface | |
| *2 | 49.0052 | DD[2] | Reflective Surface | |
| *3 | 68.9172 | DD[3] | Reflective Surface | |
| 4 | ∞ | DD[4] | | |
| *5 | 11.8032 | 5.2598 | 1.51007 | 56.24 |
| *6 | 16.0717 | DD[6] | | |
| 7 | −51.0361 | 6.2969 | 1.51680 | 64.20 |
| 8 | −23.4981 | DD[8] | | |
| 9 | 50.3782 | 9.4988 | 1.62004 | 36.26 |
| 10 | −98.5476 | −0.9144 | | |
| 11(Stop) | ∞ | 6.2479 | | |
| 12 | 37.9237 | 1.2003 | 1.80610 | 33.27 |
| 13 | 20.1466 | 9.5266 | 1.48749 | 70.44 |
| 14 | −30.6388 | 9.9992 | 1.84666 | 23.78 |

TABLE 9-continued

Example 3 Lens Data (n, ν at the d line)

| Surface Number | Radius of Curvature | Surface Distance | n | ν |
|---|---|---|---|---|
| 15 | −113.3343 | 22.5181 | | |
| 16 | 93.1332 | 5.1752 | 1.80400 | 46.58 |
| 17 | −68.5176 | 9.5000 | | |
| 18 | ∞ | 25.9700 | 1.51680 | 64.20 |
| 19 | ∞ | 0.1926 | | |

TABLE 10

Example 3 Specification (d line)

| |f| | 3.84 |
|---|---|
| Bf | 26.81 |
| FNo. | 1.60 |
| 2ω[°] | 146.4 |

TABLE 11

Example 3 Variable Surface Distance

| Projection Distance | 501 | 410 | 666 |
|---|---|---|---|
| DD[1] | 64.3029 | 64.5778 | 64.0009 |
| DD[2] | −64.3029 | −64.5778 | −64.0009 |
| DD[3] | 64.3029 | 64.5778 | 64.0009 |
| DD[4] | 1.8044 | 1.3532 | 2.3063 |
| DD[6] | 15.8551 | 15.7761 | 15.9394 |
| DD[7] | 43.3016 | 43.557 | 43.0176 |

TABLE 12

Example 3 Aspheric Surface Coefficient

| Surface Number | 1 | 2 | 3 |
|---|---|---|---|
| KA | 3.635422652830E−01 | 5.088366705594E+00 | −9.285532300163E−01 |
| A3 | 0.000000000000E+00 | 0.000000000000E+00 | 0.000000000000E+00 |
| A4 | −1.939892198548E−06 | −3.592767310459E−05 | 5.713670239600E−07 |
| A5 | 1.207115493882E−08 | 5.888789224439E−06 | 1.490247997101E−08 |
| A6 | 5.655012219910E−10 | −1.002372972429E−06 | −1.154320457466E−09 |
| A7 | −1.144320511599E−11 | 4.678670827533E−08 | 5.013935616706E−11 |
| A8 | −2.011334582805E−14 | 2.110178695478E−09 | −1.244848179142E−12 |
| A9 | 1.743024534285E−15 | −2.471550965467E−10 | 1.683312759159E−14 |
| A10 | −1.256523090234E−17 | 5.835475718309E−12 | −9.297348794267E−17 |

| Surface Number | 5 | 6 |
|---|---|---|
| KA | −9.999999972702E+00 | −1.000000218699E+01 |
| A3 | −6.162691595071E−20 | 2.284416038832E−19 |
| A4 | 5.028684388611E−04 | 3.476454271103E−04 |
| A5 | −5.148878074010E−05 | 4.812350752953E−06 |
| A6 | −7.733698034276E−07 | −3.050650460183E−06 |
| A7 | 3.567694369995E−07 | −1.992265195175E−07 |
| A8 | −1.768469236336E−08 | 2.110050219398E−08 |
| A9 | −9.329882926727E−10 | 1.469375377959E−09 |
| A10 | 8.957173265236E−11 | −9.940922660398E−11 |
| A11 | 3.158553215094E−12 | −4.808552712892E−12 |
| A12 | −3.287648396770E−13 | 2.785054338895E−13 |
| A13 | −1.914030803851E−15 | 5.901004860987E−15 |
| A14 | 3.451744809780E−16 | −3.275852950634E−16 |

Example 4

Figure 10:
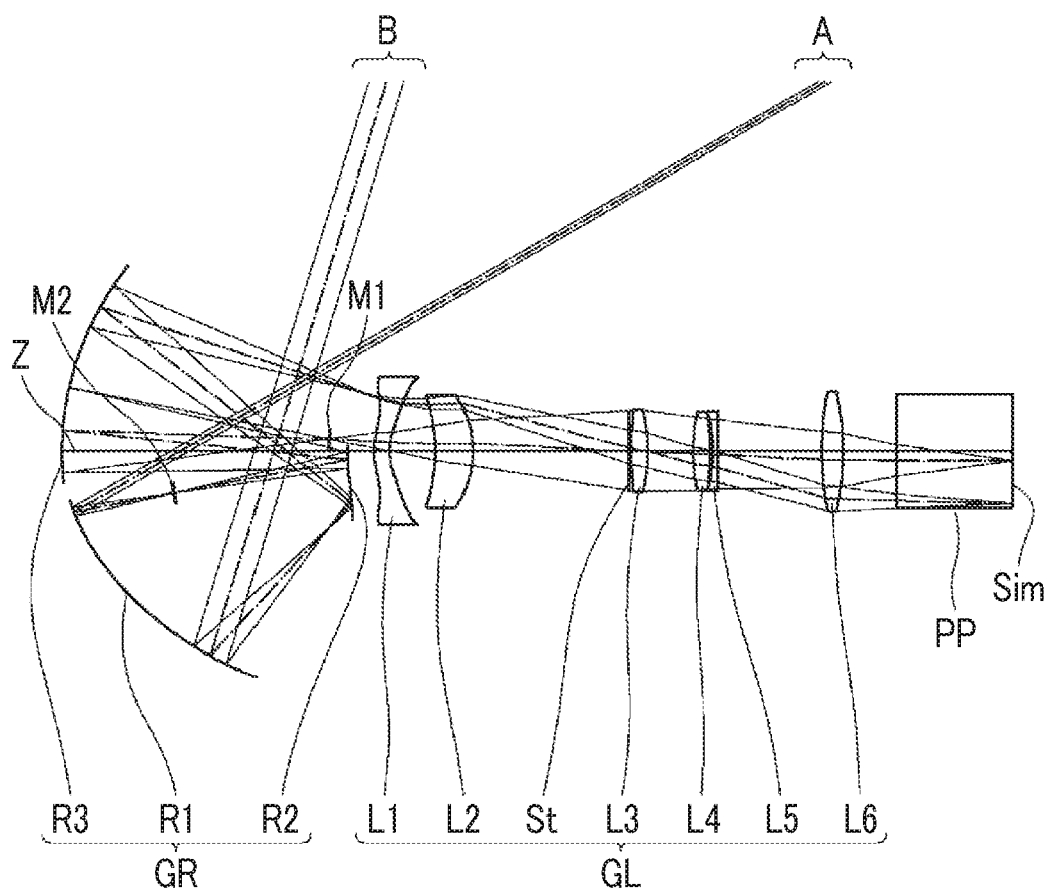
FIG. 10 is a cross-sectional view illustrating a configuration of an imaging optical system of Example 4 of the present invention.
Figure 17:
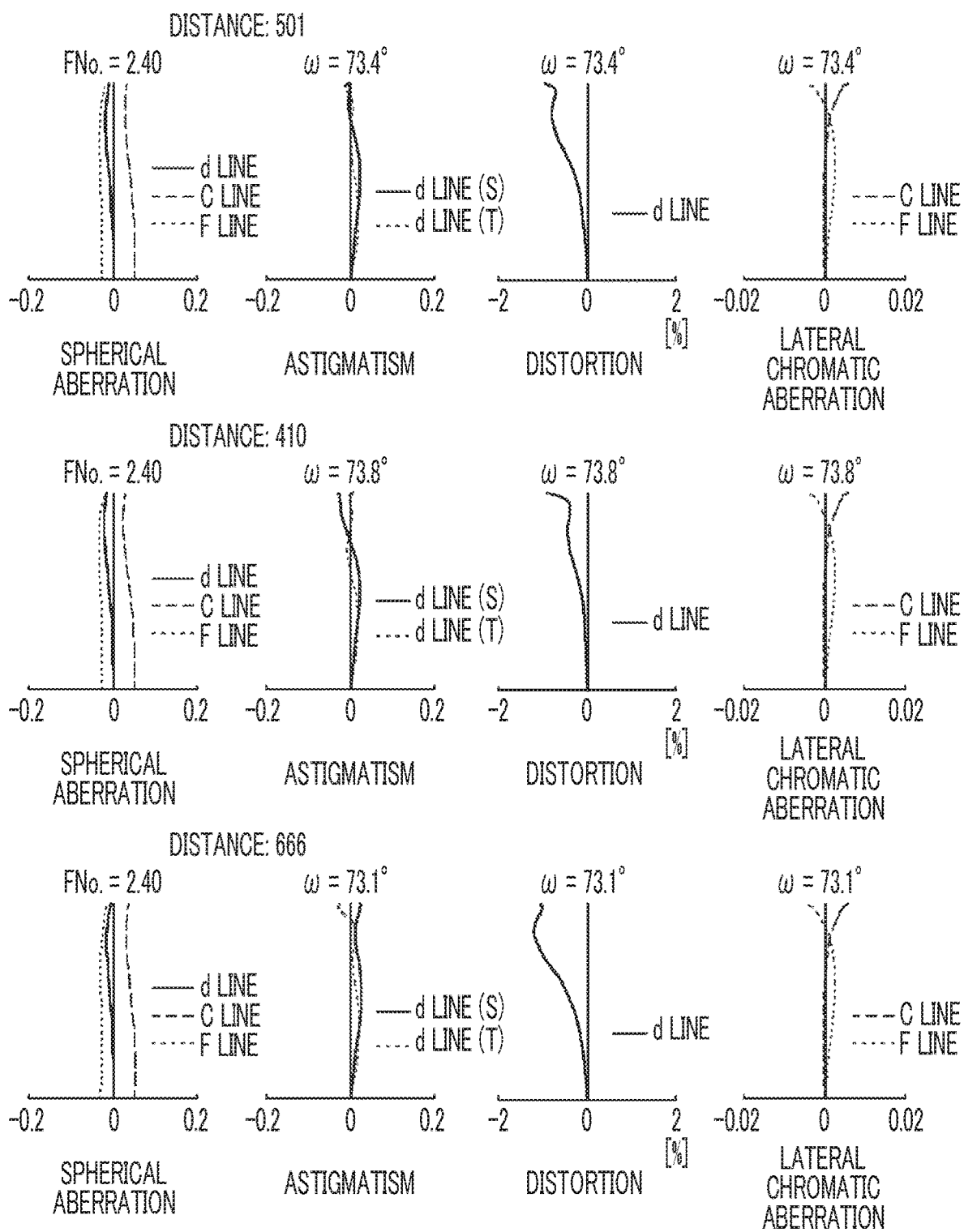
FIG. 17 is a diagram of aberrations of the imaging optical system of Example 4 of the present invention.

Next, an imaging optical system of Example 4 will be described. FIG. 10 is a cross-sectional view illustrating a configuration of the imaging optical system of Example 4. The imaging optical system of Example 4 is composed of, in order from the magnification side along the optical path, a catoptric system GR consisting of three reflective surfaces R1 to R3 and a dioptric system GL consisting of six lenses L1 to L6 and an aperture stop St. During focusing, the second reflective surface R2 and the group consisting of the lens L1 and the lens L2 move independently. Table 13 shows basic lens data of the imaging optical system of Example 4, Table 14 shows data about specification, Table 15 shows data about variable surface distances, and Table 16 shows data about aspheric surface coefficients thereof. FIG. 17 shows aberration diagrams.

TABLE 13

Example 4 Lens Data (n, ν at the d line)

| Surface Number | Radius of Curvature | Surface Distance | n | ν |
|---|---|---|---|---|
| *1 | 36.843 | DD[1] | Reflective Surface | |
| *2 | 44.4538 | DD[2] | Reflective Surface | |
| *3 | 67.7973 | DD[3] | Reflective Surface | |
| 4 | ∞ | DD[4] | | |
| *5 | 15.7497 | 3.5001 | 1.51007 | 56.24 |
| *6 | 13.5887 | 10.2705 | | |
| 7 | −41.3902 | 8.3753 | 1.65160 | 58.55 |
| 8 | −24.0188 | DD[8] | | |
| 9(Stop) | ∞ | 0.3322 | | |
| 10 | 76.1173 | 3.7756 | 1.51680 | 64.20 |
| 11 | −40.8026 | 10.2377 | | |
| 12 | 38.9144 | 3.8978 | 1.48749 | 70.44 |
| 13 | −57.6983 | 0.5371 | | |

TABLE 13-continued

Example 4 Lens Data (n, ν at the d line)

| Surface Number | Radius of Curvature | Surface Distance | n | ν |
|---|---|---|---|---|
| 14 | −38.4303 | 1.1999 | 1.84666 | 23.78 |
| 15 | 3344.5043 | 23.0765 | | |
| 16 | 71.9645 | 4.8512 | 1.72916 | 54.68 |
| 17 | −61.8628 | 12.0000 | | |
| 18 | ∞ | 26.0500 | 1.51680 | 64.20 |
| 19 | ∞ | 0.2083 | | |

TABLE 14

Example 4 Specification (d line)

| |f| | 3.83 |
|---|---|
| Bf | 29.38 |
| FNo. | 2.40 |
| 2ω[°] | 146.8 |

TABLE 15

Example 4 Variable Surface Distance

| Projection Distance | 501 | 410 | 666 |
|---|---|---|---|
| DD[1] | 63.961 | 64.1904 | 63.7146 |
| DD[2] | −63.961 | −64.1904 | −63.7146 |
| DD[3] | 63.961 | 64.1904 | 63.7146 |
| DD[4] | 6.0037 | 5.5471 | 6.4957 |
| DD[8] | 35.113 | 35.3401 | 34.8673 |

TABLE 16

Example 4 Aspheric Surface Coefficient

| Surface Number | 1 | 2 | 3 |
|---|---|---|---|
| KA | 4.105010740669E−01 | 6.628938413854E+00 | −1.014461475164E+00 |
| A3 | 0.000000000000E+00 | 0.000000000000E+00 | 0.000000000000E+00 |
| A4 | −1.285631583484E−06 | −4.010167208764E−05 | 7.363665576424E−07 |
| A5 | −5.656247088178E−09 | 2.087077457225E−06 | 6.410318325295E−09 |
| A6 | 8.792655221544E−10 | −4.873662931239E−07 | −6.526213322368E−10 |
| A7 | −1.781340374972E−11 | 2.685915218346E−08 | 2.629000546762E−11 |
| A8 | −3.925777386237E−14 | 1.172687354956E−09 | −5.624743241334E−13 |
| A9 | 5.223951156568E−15 | −1.479355585054E−10 | 6.430776347817E−15 |
| A10 | −5.360415352174E−17 | 3.246302187595E−12 | −2.941183252063E−17 |

| Surface Number | 5 | 6 |
|---|---|---|
| KA | −1.000000001465E+01 | −1.000000886379E+01 |
| A3 | 0.000000000000E+00 | 0.000000000000E+00 |
| A4 | 2.627882001565E−04 | 5.922022452944E−04 |
| A5 | −4.156958965551E−05 | −8.063981220690E−05 |
| A6 | −2.566753195987E−06 | −3.334946932015E−06 |
| A7 | 3.887855689714E−07 | 9.466848964327E−07 |
| A8 | 1.446254752946E−08 | −5.211085814377E−10 |
| A9 | −1.533458366713E−09 | −5.654252465256E−09 |
| A10 | −9.045261935846E−11 | 1.244066200191E−10 |
| A11 | 6.000682381501E−12 | 1.643527741160E−11 |
| A12 | 1.029515041033E−13 | −5.686347205031E−13 |
| A13 | −5.418873485557E−15 | −1.855393671068E−14 |
| A14 | −7.160666819850E−17 | 7.983424954734E−16 |

Example 5

Figure 11:
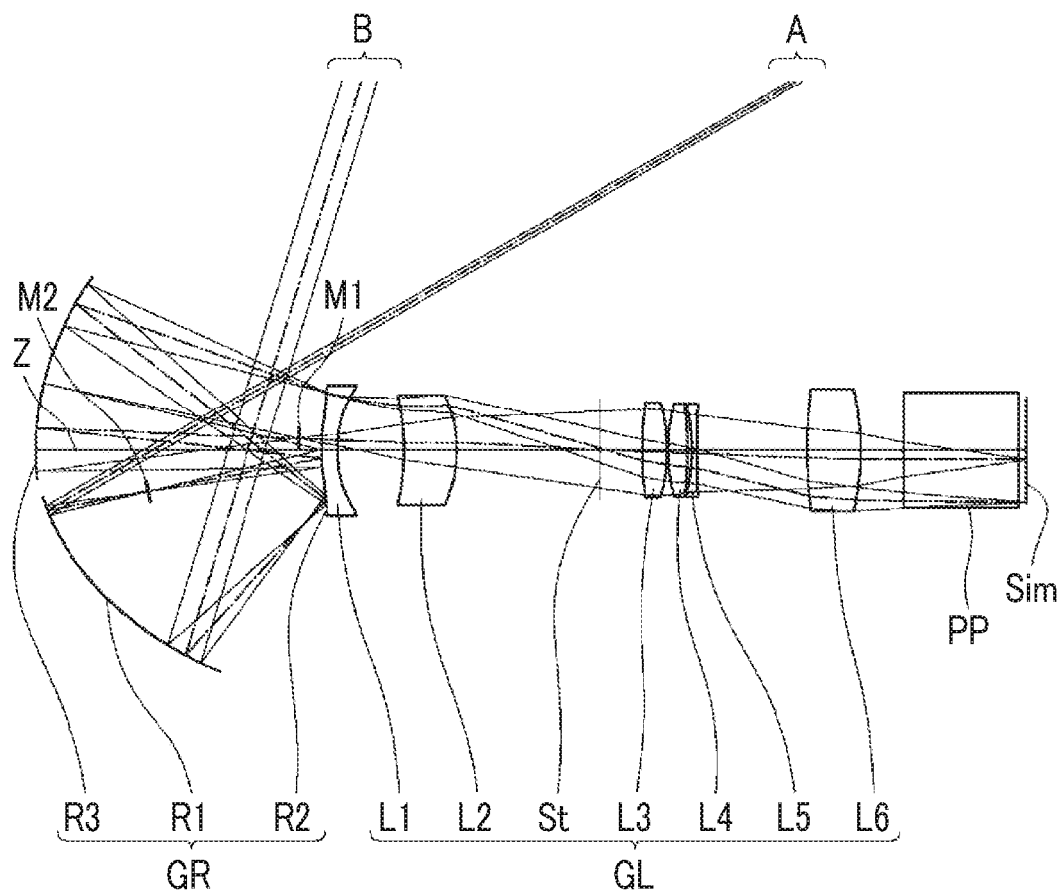
FIG. 11 is a cross-sectional view illustrating a configuration of an imaging optical system of Example 5 of the present invention.
Figure 18:
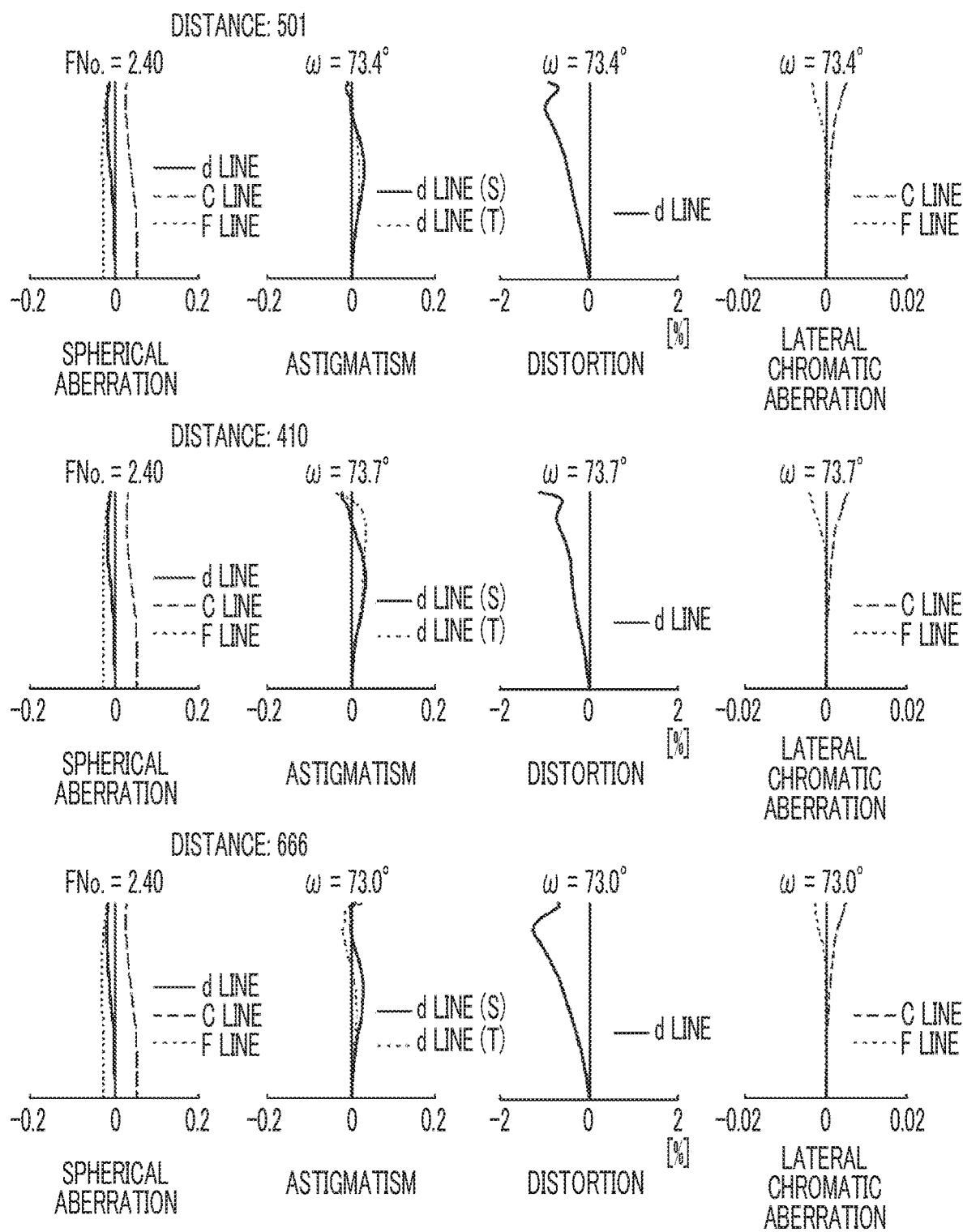
FIG. 18 is a diagram of aberrations of the imaging optical system of Example 5 of the present invention.

Next, an imaging optical system of Example 5 will be described. FIG. 11 is a cross-sectional view illustrating a configuration of the imaging optical system of Example 5. The imaging optical system of Example 5 is composed of, in order from the magnification side along the optical path, a catoptric system GR consisting of three reflective surfaces R1 to R3 and a dioptric system GL consisting of six lenses L1 to L6 and an aperture stop St. The second reflective surface R2 and the lens L1 are one optical element, and the lower half of the magnification side surface of the lens L1 in the drawing is set as the second reflective surface R2. During focusing, the lens L1 (second reflective surface R2) and the lens L2 move independently. Table 17 shows basic lens data of the imaging optical system of Example 5, Table 18 shows data about specification, Table 19 shows data about variable surface distances, and Table 20 shows data about aspheric surface coefficients thereof. FIG. 18 shows aberration diagrams.

TABLE 17

Example 5 Lens Data (n, ν at the d line)

| Surface Number | Radius of Curvature | Surface Distance | n | ν |
|---|---|---|---|---|
| *1 | 36.7859 | DD[1] | Reflective Surface | |
| *2 | 45.5809 | DD[2] | Reflective Surface | |
| *3 | 67.4844 | DD[3] | Reflective Surface | |
| *4 | 45.5809 | 3.5009 | 1.51007 | 56.24 |
| *5 | 32.8215 | DD[5] | | |
| 6 | −55.4821 | 11.9991 | 1.77250 | 49.60 |
| 7 | −30.4839 | DD[7] | | |
| 8 | 80.0688 | 5.5836 | 1.58913 | 61.13 |
| 9 | −42.0310 | −15.1158 | | |
| 10(Stop) | ∞ | 15.3132 | | |
| 11 | 41.9470 | 4.3407 | 1.48749 | 70.44 |
| 12 | −107.7109 | 0.9498 | | |
| 13 | −47.6644 | 1.2010 | 1.84666 | 23.78 |
| 14 | 276.4245 | 24.7635 | | |
| 15 | 105.9126 | 11.9992 | 1.77250 | 49.60 |
| 16 | −61.7536 | 9.5000 | | |
| 17 | ∞ | 25.9700 | 1.51680 | 64.20 |
| 18 | ∞ | 1.8227 | | |

TABLE 18

Example 5 Specification (d line)

| | |
|---|---|
| \|f\| | 3.83 |
| Bf | 28.44 |
| FNo. | 2.40 |
| 2ω[°] | 146.8 |

TABLE 19

Example 5 Variable Surface Distance

| Projection Distance | 501 | 410 | 666 |
|---|---|---|---|
| DD[1] | 64.2367 | 64.4232 | 64.0344 |
| DD[2] | −64.2367 | −64.4232 | −64.0344 |
| DD[3] | 64.2367 | 64.4232 | 64.0344 |
| DD[5] | 14.9311 | 14.6463 | 15.242 |
| DD[7] | 41.2989 | 41.3973 | 41.1903 |

TABLE 20

Example 5 Aspheric Surface Coefficient

| Surface Number | 1 | 2 |
|---|---|---|
| KA | 4.076346986737E−01 | 7.787675653767E+00 |
| A3 | 0.000000000000E+00 | 0.000000000000E+00 |
| A4 | −1.010304714893E−06 | −2.756280577411E−05 |
| A5 | −1.420692104992E−08 | 2.903733409535E−06 |
| A6 | 8.097281986577E−10 | −1.005283100019E−06 |
| A7 | −1.158797960838E−11 | 5.972542179454E−08 |
| A8 | −7.616933633525E−14 | 2.660664612139E−09 |
| A9 | 3.951726844511E−15 | −3.535963983207E−10 |
| A10 | −3.942412372527E−17 | 8.407330834821E−12 |

TABLE 20-continued

Example 5 Aspheric Surface Coefficient

| Surface Number | 3 | 4 |
|---|---|---|
| KA | −1.004172228228E+00 | 7.787675632967E+00 |
| A3 | 0.000000000000E+00 | 0.000000000000E+00 |
| A4 | 7.251335824844E−07 | −2.756280903253E−05 |
| A5 | 8.264551301118E−09 | 2.903732918613E−06 |
| A6 | −6.616831833015E−10 | −1.005282906077E−06 |
| A7 | 2.541722303767E−11 | 5.972541275886E−08 |
| A8 | −5.398451009948E−13 | 2.660663954543E−09 |
| A9 | 6.354059164972E−15 | −3.535963266843E−10 |
| A10 | −3.072374868603E−17 | 8.407328982873E−12 |

| Surface Number | 5 |
|---|---|
| KA | −1.000000740402E+01 |
| A3 | 0.000000000000E+00 |
| A4 | 7.263226979253E−05 |
| A5 | −1.114792796306E−05 |
| A6 | 1.784953796245E−06 |
| A7 | 7.855904628653E−08 |
| A8 | −2.344987685070E−08 |
| A9 | −3.445663236676E−10 |
| A10 | 1.356284177910E−10 |
| A11 | 6.140626493607E−13 |
| A12 | −3.670697820466E−13 |
| A13 | −3.317471968416E−16 |
| A14 | 3.746825797801E−16 |

Example 6

Figure 12:
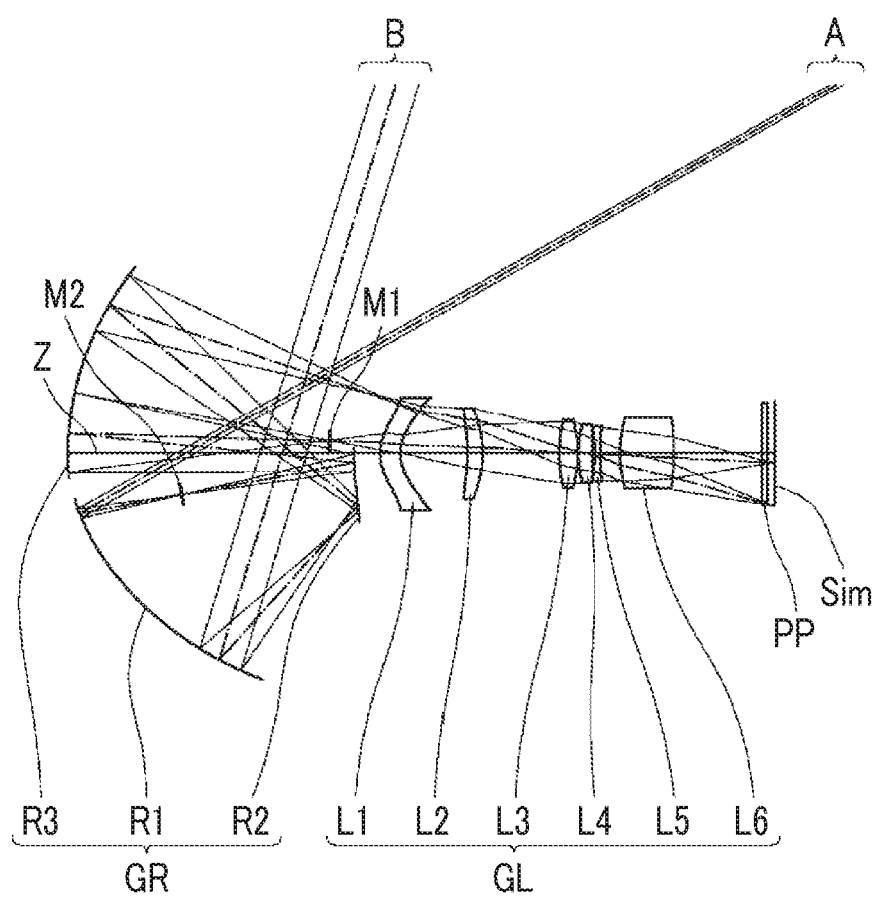
FIG. 12 is a cross-sectional view illustrating a configuration of an imaging optical system of Example 6 of the present invention.
Figure 19:
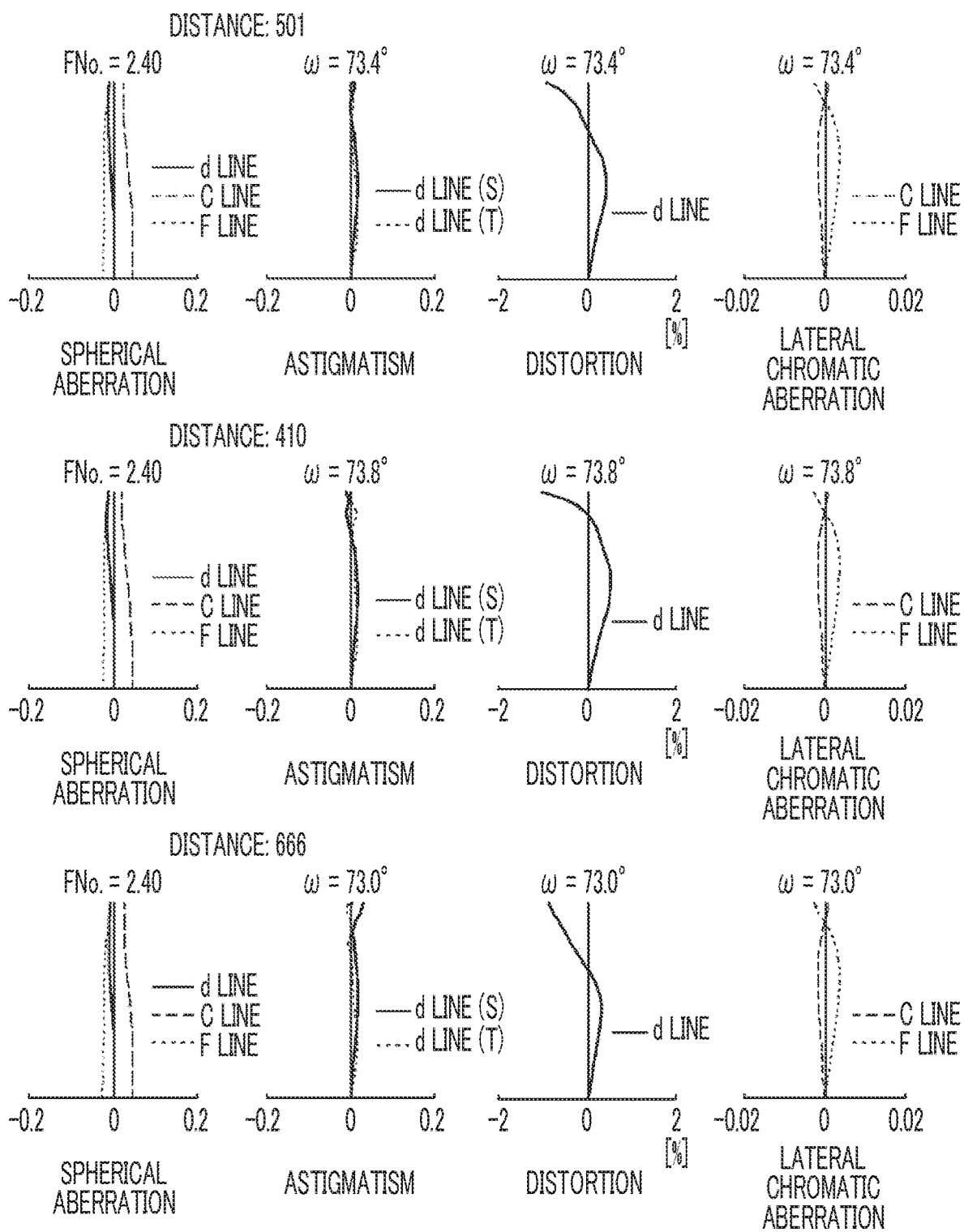
FIG. 19 is a diagram of aberrations of the imaging optical system of Example 6 of the present invention.

Next, an imaging optical system of Example 6 will be described. FIG. 12 is a cross-sectional view illustrating a configuration of the imaging optical system of Example 6. The imaging optical system of Example 6 is composed of, in order from the magnification side along the optical path, a catoptric system GR consisting of three reflective surfaces R1 to R3 and a dioptric system GL consisting of six lenses L1 to L6. During focusing, the second reflective surface R2, the lens L1, and the lens L2 move independently of each other. Table 21 shows basic lens data of the imaging optical system of Example 6, Table 22 shows data about specification, Table 23 shows data about variable surface distances, and Table 24 shows data about aspheric surface coefficients thereof. FIG. 19 shows aberration diagrams.

TABLE 21

Example 6 Lens Data (n, ν at the d line)

| Surface Number | Radius of Curvature | Surface Distance | n | ν |
|---|---|---|---|---|
| *1 | 36.5194 | DD[1] | Reflective Surface | |
| *2 | 52.1751 | DD[2] | Reflective Surface | |
| *3 | 67.3683 | DD[3] | Reflective Surface | |
| 4 | ∞ | DD[4] | | |
| *5 | 10.6719 | 4.5603 | 1.51007 | 56.24 |
| *6 | 10.2805 | DD[6] | | |
| 7 | −65.4002 | 3.4453 | 1.65160 | 58.55 |
| 8 | −26.8490 | DD[8] | | |
| 9 | 36.1683 | 4.0655 | 1.60311 | 60.64 |
| 10 | −32.2032 | 0.2003 | | |
| 11 | 25.0649 | 3.1352 | 1.48749 | 70.44 |
| 12 | −153.1135 | 0.5621 | | |
| 13 | −36.1070 | 1.2004 | 1.84666 | 23.78 |
| 14 | 53.3493 | 4.4311 | | |

TABLE 21-continued

Example 6 Lens Data (n, ν at the d line)

| Surface Number | Radius of Curvature | Surface Distance | n | ν |
|---|---|---|---|---|
| 15 | 34.1962 | 11.9991 | 1.56732 | 42.82 |
| 16 | −51.6977 | 19.7000 | | |
| 17 | ∞ | 1.0500 | 1.51680 | 64.20 |
| 18 | ∞ | 1.7303 | | |

TABLE 22

Example 6 Specification (d line)

| | |
|---|---|
| \|f\| | 3.83 |
| Bf | 22.12 |
| FNo. | 2.40 |
| 2ω[°] | 146.8 |

TABLE 23

Example 6 Variable Surface Distance

| Projection Distance | 501 | 410 | 666 |
|---|---|---|---|
| DD[1] | 63.8243 | 64.0403 | 63.5904 |
| DD[2] | −63.8243 | −64.0403 | −63.5904 |
| DD[3] | 63.8243 | 64.0403 | 63.5904 |
| DD[4] | 5.8301 | 5.4691 | 6.218 |
| DD[6] | 14.6922 | 14.6633 | 14.7269 |
| DD[8] | 17.1548 | 17.3287 | 16.9661 |

TABLE 24

Example 6 Aspheric Surface Coefficient

| Surface Number | 1 | 2 | 3 |
|---|---|---|---|
| KA | 4.012076192410E−01 | 8.229936594331E+00 | −1.009138171375E+00 |
| A3 | 5.981135896927E−21 | 0.000000000000E+00 | 1.739595173216E−20 |
| A4 | −1.676021161837E−06 | −5.227705248918E−05 | 7.330641145484E−07 |
| A5 | 5.895393180814E−09 | 7.436447346407E−06 | 5.771435925627E−09 |
| A6 | 9.529966827742E−10 | −8.816669845159E−07 | −6.189657827427E−10 |
| A7 | −2.551055520801E−11 | 2.359562744641E−08 | 2.522888256842E−11 |
| A8 | 1.020379442877E−14 | 3.077356808651E−09 | −5.428527401371E−13 |
| A9 | 6.977043878230E−15 | −2.504333283108E−10 | 6.248888071986E−15 |
| A10 | −7.422430811814E−17 | 5.310576810658E−12 | −2.867128182833E−17 |

| Surface Number | 5 | 6 |
|---|---|---|
| KA | −1.000000001465E+01 | −1.000000617447E+01 |
| A3 | 0.000000000000E+00 | 0.000000000000E+00 |
| A4 | 1.168387710500E−03 | 1.526445627572E−03 |
| A5 | −1.517870373264E−04 | −1.985198321552E−04 |
| A6 | −6.702620907477E−06 | −1.008352004789E−05 |
| A7 | 2.312903017607E−06 | 3.497685513038E−06 |
| A8 | −5.385922011938E−08 | −6.983758409702E−08 |
| A9 | −1.537978974941E−08 | −3.144902636308E−08 |
| A10 | 5.865724284962E−10 | 1.679781728506E−09 |
| A11 | 8.083111067261E−11 | 1.368186235413E−10 |
| A12 | −4.449297797025E−12 | −1.003289979159E−11 |
| A13 | −1.133031726416E−13 | −2.301771223655E−13 |
| A14 | 7.868147981331E−15 | 2.034520145242E−14 |

Example 7

Figure 13:
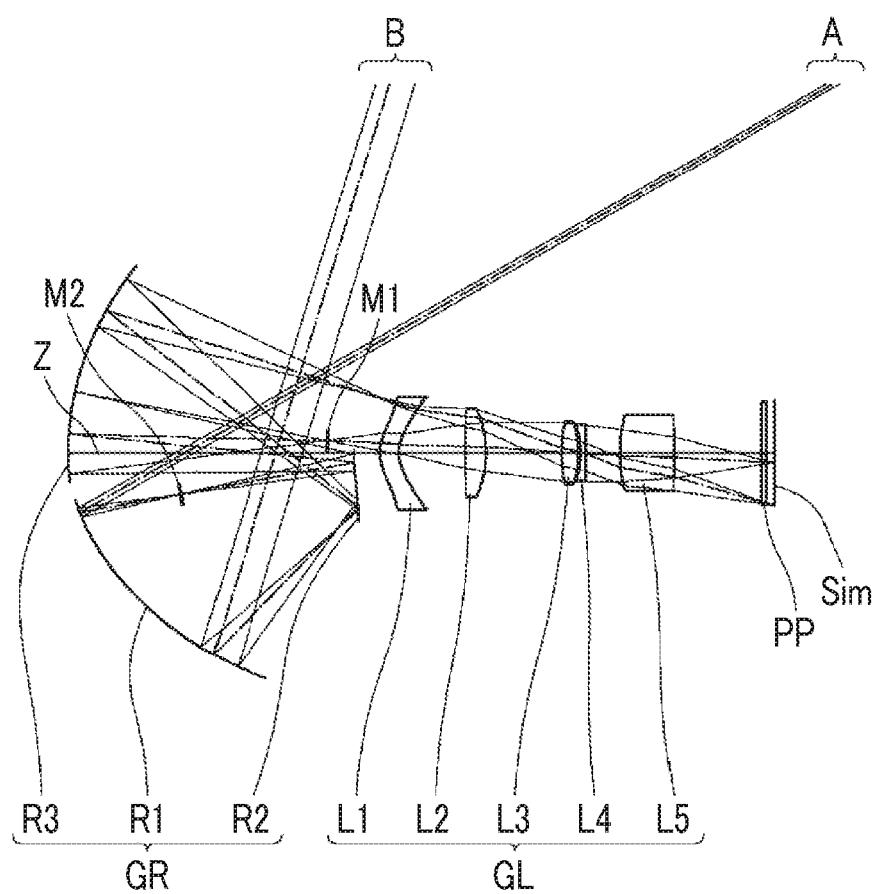
FIG. 13 is a cross-sectional view illustrating a configuration of an imaging optical system of Example 7 of the present invention.
Figure 20:
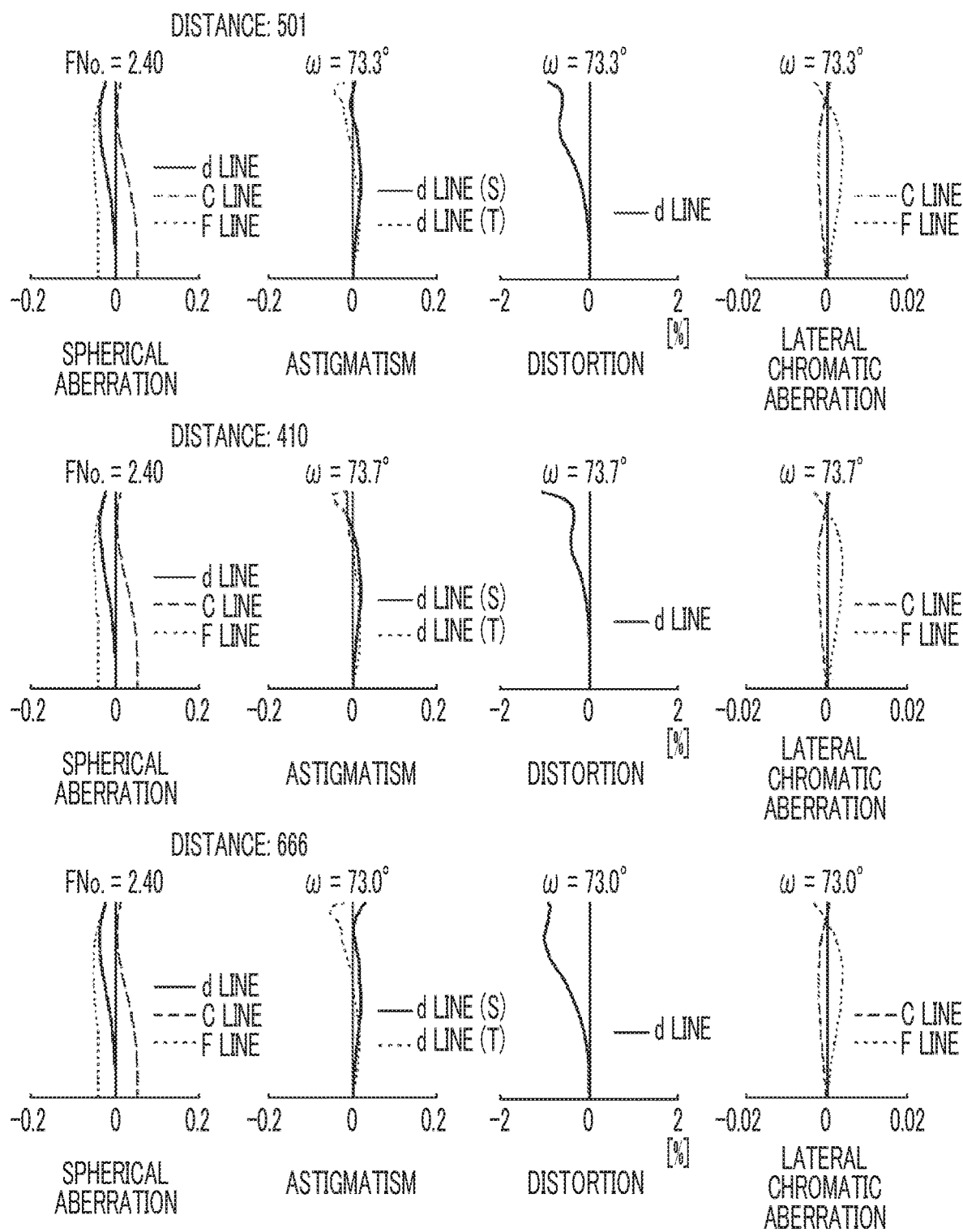
FIG. 20 is a diagram of aberrations of the imaging optical system of Example 7 of the present invention.

Next, an imaging optical system of Example 7 will be described. FIG. 13 is a cross-sectional view illustrating a configuration of the imaging optical system of Example 7. The imaging optical system of Example 7 is composed of, in order from the magnification side along the optical path, a catoptric system GR consisting of three reflective surfaces R1 to R3 and a dioptric system GL consisting of five lenses L1 to L5. During focusing, the second reflective surface R2, the lens L1, and the lens L2 move independently of each other. Table 25 shows basic lens data of the imaging optical system of Example 7, Table 26 shows data about specification, Table 27 shows data about variable surface distances, and Table 28 shows data about aspheric surface coefficients thereof. FIG. 20 shows aberration diagrams.

TABLE 25

Example 7 Lens Data (n, ν at the d line)

| Surface Number | Radius of Curvature | Surface Distance | n | ν |
|---|---|---|---|---|
| *1 | 36.3101 | DD[1] | Reflective Surface | |
| *2 | 49.2798 | DD[2] | Reflective Surface | |
| *3 | 66.7324 | DD[3] | Reflective Surface | |
| 4 | ∞ | DD[4] | | |
| *5 | 10.6704 | 4.2758 | 1.51007 | 56.24 |
| *6 | 10.0698 | DD[6] | | |
| 7 | 195.5486 | 4.6613 | 1.51680 | 64.20 |
| 8 | −25.9061 | DD[8] | | |

TABLE 25-continued

Example 7 Lens Data (n, ν at the d line)

| Surface Number | Radius of Curvature | Surface Distance | n | ν |
|---|---|---|---|---|
| 9 | 34.1660 | 3.6738 | 1.72916 | 54.68 |
| 10 | −22.7938 | 0.5292 | | |
| 11 | −20.8572 | 1.2004 | 1.84666 | 23.78 |
| 12 | −166.7963 | 7.5360 | | |
| 13 | 33.4469 | 12.0009 | 1.72916 | 54.68 |
| 14 | −201.2406 | 19.7000 | | |
| 15 | ∞ | 1.0500 | 1.51680 | 64.20 |
| 16 | ∞ | 1.7370 | | |

TABLE 26

Example 7 Specification (d line)

| |f| | 3.83 |
|---|---|
| Bf | 22.13 |

TABLE 26-continued

Example 7 Specification (d line)

| FNo. | 2.40 |
|---|---|
| 2ω[°] | 146.6 |

TABLE 27

Example 7 Variable Surface Distance

| Projection Distance | 501 | 410 | 666 |
|---|---|---|---|
| DD[1] | 63.7261 | 63.9422 | 63.5011 |
| DD[2] | −63.7261 | −63.9422 | −63.5011 |
| DD[3] | 63.7261 | 63.9422 | 63.5011 |
| DD[4] | 5.8351 | 5.5172 | 6.1892 |
| DD[6] | 14.6934 | 14.6676 | 14.7019 |
| DD[8] | 16.9356 | 17.0632 | 16.798 |

TABLE 28

Example 7 Aspheric Surface Coefficient

| Surface Number | 1 | 2 | 3 |
|---|---|---|---|
| KA | 3.958269143749E−01 | 7.747628689837E+00 | −1.313045015919E+00 |
| A3 | 0.000000000000E+00 | 0.000000000000E+00 | 0.000000000000E+00 |
| A4 | −1.469177633910E−06 | −5.852893543484E−05 | 8.857029589600E−07 |
| A5 | −6.837538083940E−10 | 7.381715741972E−06 | 5.631839290148E−09 |
| A6 | 8.673823779865E−10 | −8.811674257969E−07 | −6.825701392196E−10 |
| A7 | −1.932284090255E−11 | 2.637570727535E−08 | 2.730248173979E−11 |
| A8 | −3.314572940373E−14 | 3.115197416420E−09 | −5.922781081758E−13 |
| A9 | 5.635443301889E−15 | −2.749292935231E−10 | 6.928418358524E−15 |
| A10 | −5.627845298783E−17 | 6.161288821388E−12 | −3.184816611468E−17 |

| Surface Number | 5 | 6 |
|---|---|---|
| KA | −1.000000799177E+01 | −1.000000054397E+01 |
| A3 | 0.000000000000E+00 | 0.000000000000E+00 |
| A4 | 1.093318194931E−03 | 1.527506105871E−03 |
| A5 | −1.479320454417E−04 | −2.090401032346E−04 |
| A6 | −6.687781949831E−06 | −1.041042090994E−05 |
| A7 | 2.218641389871E−06 | 3.607905694203E−06 |
| A8 | −4.869320762882E−08 | −6.214264433969E−08 |
| A9 | −1.461211058338E−08 | −3.196060362228E−08 |
| A10 | 5.784071701995E−10 | 1.620004896682E−09 |
| A11 | 7.598217812997E−11 | 1.377296583625E−10 |
| A12 | −4.436187484344E−12 | −9.822004641087E−12 |
| A13 | −1.055389415805E−13 | −2.304975501303E−13 |
| A14 | 7.993115039854E−15 | 2.008305408441E−14 |

Table 29 shows values corresponding to Conditional Expressions (1) to (4) of the imaging optical systems of Examples 1 to 7. It should be noted that, in the above-mentioned examples, the d line is set as the reference wavelength, and the values shown in Table 29 are values at the reference wavelength.

TABLE 29

| Expression Number | Conditional Expression | Example 1 | Example 2 | Example 3 | Example 4 | Example 5 | Example 6 | Example 7 |
|---|---|---|---|---|---|---|---|---|
| (1) | |f1| | 18.26 | 18.20 | 17.88 | 18.42 | 18.39 | 18.26 | 18.16 |
| (1) | |f3| | 34.93 | 35.12 | 34.46 | 33.90 | 33.74 | 33.68 | 33.37 |
| (2) | |f|/fL | 0.04 | 0.04 | −0.03 | 0.07 | 0.08 | 0.12 | 0.12 |
| (3) | |fR/f| | 1.26 | 1.23 | 1.21 | 1.19 | 1.18 | 1.25 | 1.20 |
| (4) | Bf/|f| | 7.01 | 7.01 | 7.00 | 7.67 | 7.43 | 5.78 | 5.78 |

As can be seen from the above data, since all the imaging optical systems of Examples 1 to 7 satisfy Conditional Expressions (1) to (4), each imaging optical system has a high optical performance, in which various aberrations are satisfactorily corrected, while having a small size and a wide angle as a total angle of 130° or more.

Figure 21:
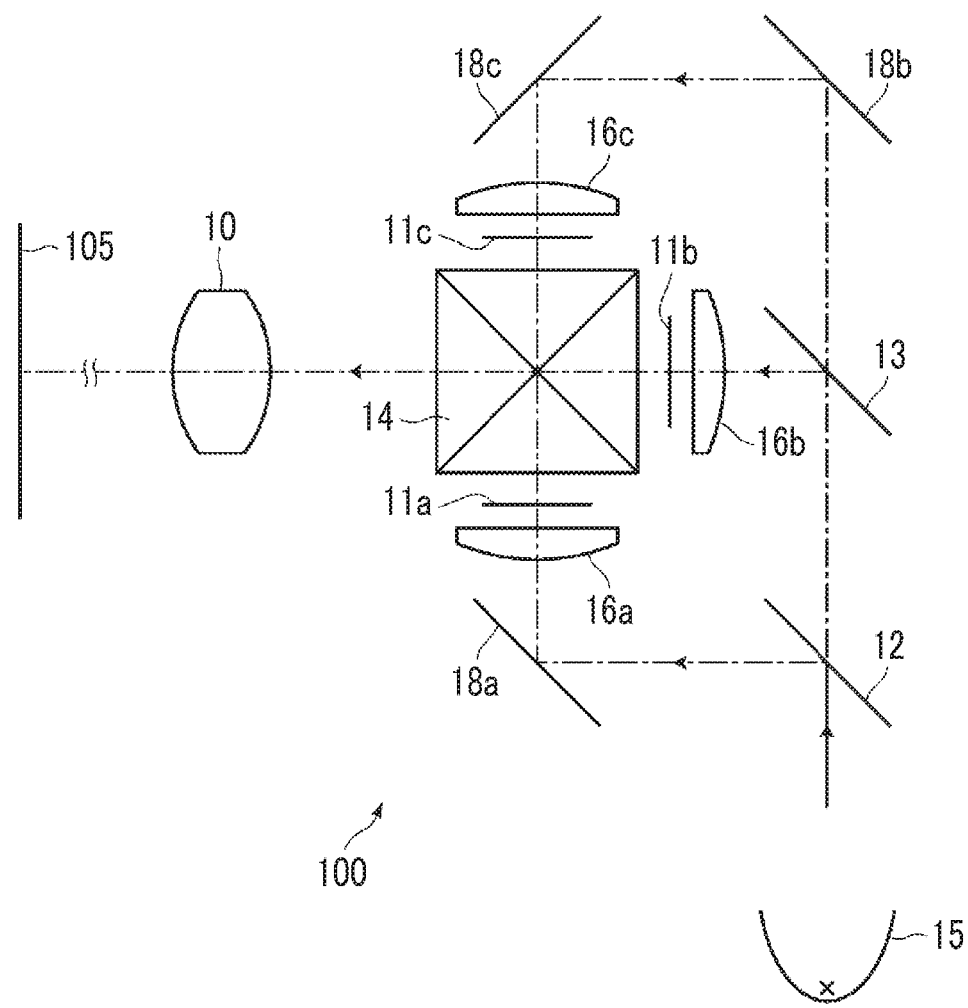
FIG. 21 is a schematic configuration diagram of a projection display device according to an embodiment of the present invention.

Next, a projection display device according to an embodiment of the present invention will be described. FIG. 21 is a schematic configuration diagram of the projection display device according to the above-mentioned embodiment of the present invention. The projection display device 100 shown in FIG. 21 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical axis. In FIG. 21, the imaging optical system 10 is schematically illustrated. Further, an integrator is disposed between the light source 15 and the dichroic mirror 12 but not shown in FIG. 21.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 22:
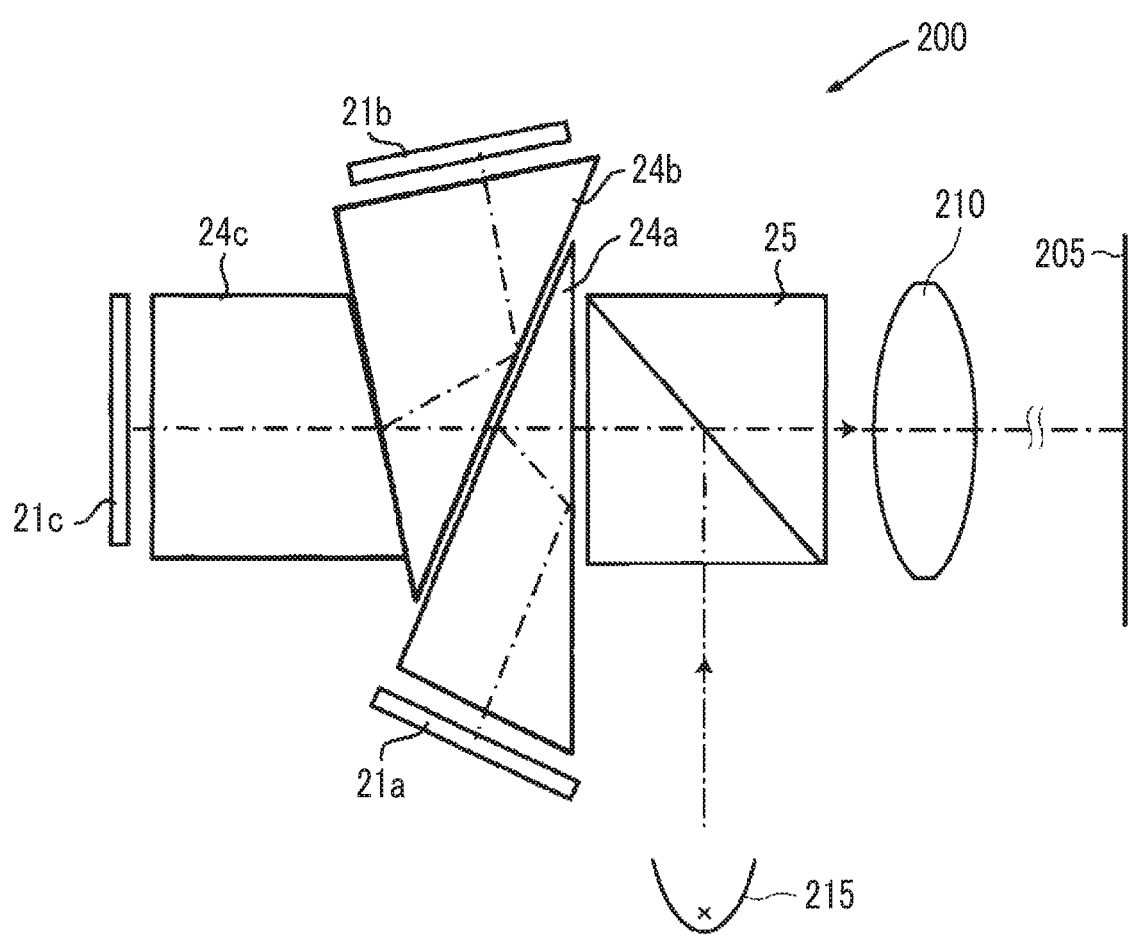
FIG. 22 is a schematic configuration diagram of a projection display device according to another embodiment of the present invention.

FIG. 22 is a schematic configuration diagram of a projection display device according to another embodiment of the present invention. The projection display device 200 shown in FIG. 22 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 22, the imaging optical system 210 is schematically illustrated. Further, an integrator is disposed between the light source 215 and the polarization separating prism 25, but illustration thereof is omitted in FIG. 22.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 23:
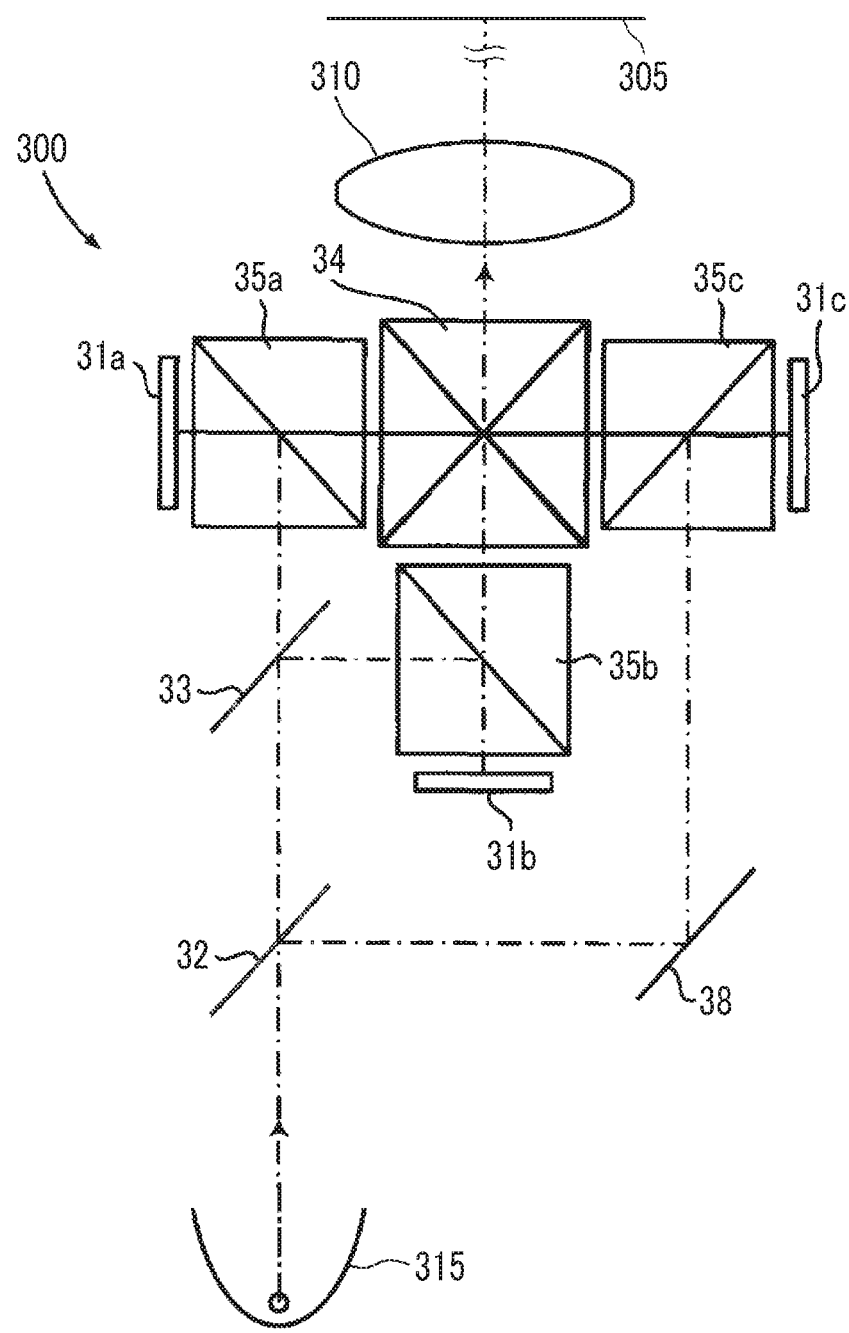
FIG. 23 is a schematic configuration diagram of a projection display device according to still another embodiment of the present invention.

FIG. 23 is a schematic configuration diagram of a projection display device according to still another embodiment of the present invention. The projection display device 300 shown in FIG. 23 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical axis, and polarization separating prisms 35a to 35c. In FIG. 23, the imaging optical system 310 is schematically illustrated. Further, an integrator is disposed between the light source 315 and the dichroic mirror 32 but not shown in FIG. 23.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 24:
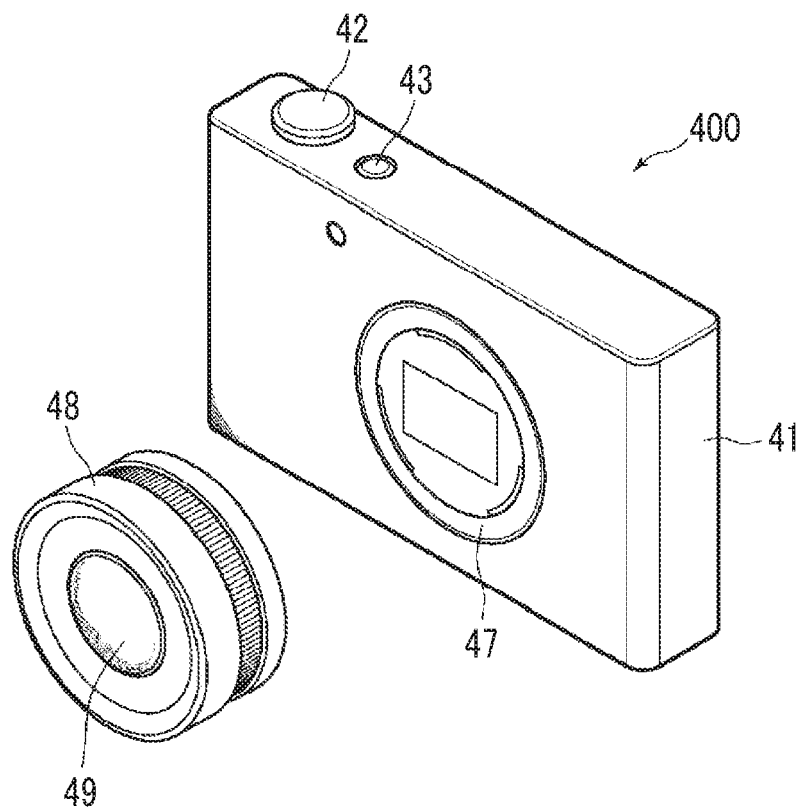
FIG. 24 is a perspective view of the front side of an imaging apparatus according to an embodiment of the present invention.
Figure 25:
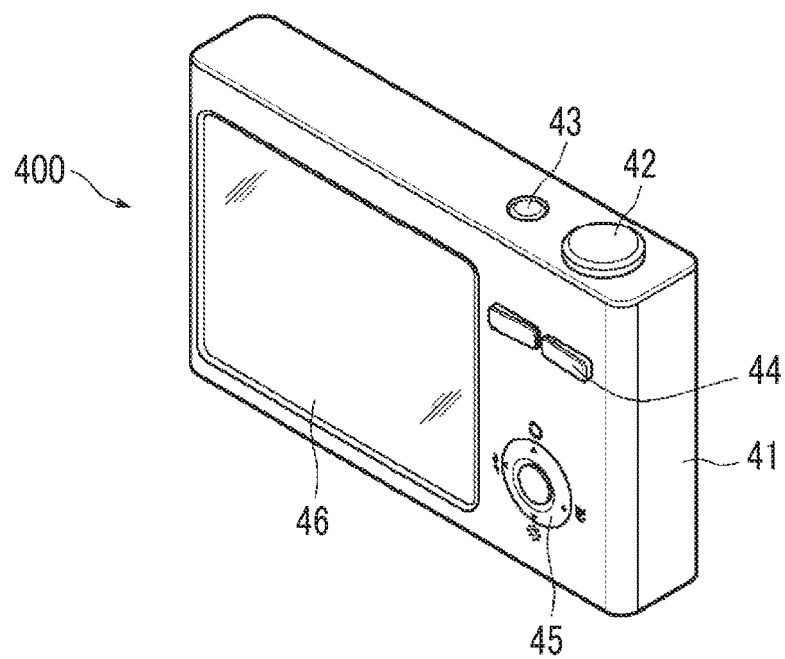
FIG. 25 is a perspective view of the rear side of the imaging apparatus shown in FIG. 24.

FIGS. 24 and 25 are external views of a camera 400 which is the imaging apparatus according to the above-mentioned embodiment of the present invention. FIG. 24 is a perspective view of the camera 400 viewed from the front side, and FIG. 25 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and/or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface distance, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms. The light valve is not limited to a configuration in which light from a light source is spatially modulated by an image display element and output as an optical image based on image data, and may be configured to output light itself, which is output from a self-luminous image display element, as an optical image based on image data. Examples of the self-luminous image display element include an image display element in which light-emitting elements such as light emitting diodes (LED) or organic light emitting diodes (OLED) are two-dimensionally arranged.

Further, the imaging apparatus of the present invention is also not limited to the above-mentioned configurations. For example, the present invention may be applied to a single-lens reflex camera, a film camera, a video camera, and the like.

EXPLANATION OF REFERENCES

1: housing
2: optical window
10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
A: rays with minimum angle of view
B: rays with maximum angle of view
GL: dioptric system
GR: catoptric system
L1 to L7: lens
M1, M2: intermediate image
PP: optical member
R1 to R5: reflective surface
Sim: image display surface
St: aperture stop
Z: optical axis

What is claimed is:

1. An imaging optical system consisting of, in order from a magnification side:
a catoptric system; and
a dioptric system that includes a plurality of lenses,
wherein the dioptric system forms a first intermediate image between the dioptric system and the catoptric system on an optical path and at a position conjugate to a reduction side imaging surface, and the catoptric system re-forms the first intermediate image on a magnification side imaging surface, and
wherein the catoptric system consists of, in order from the magnification side along the optical path, a first reflective surface having a positive power, a second reflective surface having a curved surface shape, and a third reflective surface having a positive power,
wherein rays traveling from the first reflective surface to the magnification side intersect rays traveling from the reduction side imaging surface to the magnification side imaging surface twice in the catoptric system, and
wherein assuming that
a focal length of the first reflective surface is f1, and
a focal length of the third reflective surface is f3,
Conditional Expression (1) is satisfied, which is represented by $$|f1|<|f3| \qquad (1).$$

2. A projection display device comprising:
a light valve that outputs an optical image based on image data; and
the imaging optical system according to claim 1,
wherein the imaging optical system projects the optical image, which is output from the light valve, on a screen.

3. An imaging optical system consisting of, in order from a magnification side:
a catoptric system; and
a dioptric system that includes a plurality of lenses,
wherein the dioptric system forms a first intermediate image between the dioptric system and the catoptric system on an optical path and at a position conjugate to a reduction side imaging surface, and the catoptric system re-forms the first intermediate image on a magnification side imaging surface, and
wherein the catoptric system consists of, in order from the magnification side along the optical path, a first reflective surface having a positive power, a second reflective surface having a curved surface shape, and a third reflective surface having a positive power,
wherein rays traveling from the first reflective surface to the magnification side intersect rays traveling from the reduction side imaging surface to the magnification side imaging surface twice in the catoptric system, and
wherein assuming that
a focal length of the whole system is f, and
a focal length of the dioptric system is fL,
Conditional Expression (2) is satisfied, which is represented by $$-0.15<|f|/fL<0.3 \qquad (2).$$

4. A projection display device comprising:
a light valve that outputs an optical image based on image data; and
the imaging optical system according to claim 3,
wherein the imaging optical system projects the optical image, which is output from the light valve, on a screen.

5. An imaging optical system consisting of, in order from a magnification side:
a catoptric system; and
a dioptric system that includes a plurality of lenses,
wherein the dioptric system forms a first intermediate image between the dioptric system and the catoptric system on an optical path and at a position conjugate to a reduction side imaging surface, and the catoptric system re-forms the first intermediate image on a magnification side imaging surface, and wherein the catoptric system consists of, in order from the magnification side along the optical path, a first reflective surface having a positive power, a second reflective surface having a curved surface shape and a negative power, and a third reflective surface having a positive power.

6. The imaging optical system according to claim 5, wherein a second intermediate image is formed between the first reflective surface and the second reflective surface on the optical path and at a position conjugate to the first intermediate image.

7. The imaging optical system according to claim 5, wherein the second reflective surface has a negative power.

8. The imaging optical system according to claim 5,
wherein all optical surfaces of the catoptric system are composed of rotationally symmetric surfaces centered on an optical axis of the catoptric system, and
wherein all optical surfaces of the dioptric system are composed of rotationally symmetric surfaces centered on an optical axis of the dioptric system.

9. The imaging optical system according to claim 8, wherein the optical axis of the catoptric system and the optical axis of the dioptric system are a common optical axis.

10. The imaging optical system according to claim 5, wherein assuming that
a focal length of the first reflective surface is f1, and
a focal length of the third reflective surface is f3,
Conditional Expression (1) is satisfied, which is represented by $$|f1|<|f3| \tag{1}$$

11. The imaging optical system according to claim 5, wherein assuming that
a focal length of the whole system is f, and
a focal length of the dioptric system is fL,
Conditional Expression (2) is satisfied, which is represented by $$-0.15<|f|/fL<0.3 \tag{2}$$

12. The imaging optical system according to claim 11, wherein Conditional Expression (2-1) is satisfied, which is represented by $$-0.1<|f|/fL<0.2 \tag{2-1}$$

13. The imaging optical system according to claim 5, wherein assuming that
a focal length of the catoptric system is fR, and
a focal length of the whole system is f,
Conditional Expression (3) is satisfied, which is represented by $$0.8<|fR/f|<1.8 \tag{3}$$

14. The imaging optical system according to claim 13, wherein Conditional Expression (3-1) is satisfied, which is represented by $$1<|fR/f|<1.5 \tag{3-1}$$

15. The imaging optical system according to claim 5, wherein assuming that
a back focal length of the whole system is Bf, and
a focal length of the whole system is f,
Conditional Expression (4) is satisfied, which is represented by $$2<Bf/|f| \tag{4}$$

16. The imaging optical system according to claim 15, wherein Conditional Expression (4-1) is satisfied, which is represented by $$4<Bf/|f|<15 \tag{4-1}$$

17. The imaging optical system according to claim 5, wherein during focusing, a reflective surface closest to the dioptric system among the first reflective surface, the second reflective surface, and the third reflective surface is moved, and a part of the dioptric system is moved.

18. A projection display device comprising:
a light valve that outputs an optical image based on image data; and
the imaging optical system according to claim 5,
wherein the imaging optical system projects the optical image, which is output from the light valve, on a screen.

19. An imaging apparatus comprising the imaging optical system according to claim 5.

* * * * *